United States Patent
Li et al.

(10) Patent No.: US 11,100,227 B2
(45) Date of Patent: Aug. 24, 2021

(54) SECURITY INDICATION INFORMATION CONFIGURATION METHOD AND DEVICE

(71) Applicant: HUAWEI TECHNOLOGIES CO., LTD., Shenzhen (CN)

(72) Inventors: Guoqing Li, Shenzhen (CN); Xinmiao Chang, Beijing (CN); Zi Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 320 days.

(21) Appl. No.: 15/779,090

(22) PCT Filed: Nov. 25, 2015

(86) PCT No.: PCT/CN2015/095573
§ 371 (c)(1),
(2) Date: May 25, 2018

(87) PCT Pub. No.: WO2017/088135
PCT Pub. Date: Jun. 1, 2017

(65) Prior Publication Data
US 2018/0357418 A1   Dec. 13, 2018

(51) Int. Cl.
*G06F 21/60* (2013.01)
*G06F 21/57* (2013.01)
(Continued)

(52) U.S. Cl.
CPC .............. *G06F 21/57* (2013.01); *G06F 21/44* (2013.01); *G06F 21/566* (2013.01); *G06F 21/71* (2013.01);
(Continued)

(58) Field of Classification Search
CPC ........ G06F 21/57; G06F 21/44; G06F 21/566; G06F 21/71; G06F 21/74; H04W 8/18;
(Continued)

(56) References Cited

U.S. PATENT DOCUMENTS

2013/0263215 A1  10/2013  Ekdahl
2014/0004825 A1   1/2014  Prakash et al.
(Continued)

FOREIGN PATENT DOCUMENTS

CN   101174943 A   5/2008
CN   103648090 A   3/2014
(Continued)

OTHER PUBLICATIONS

XP032605934 Ghada Arfaoui et al., "Trusted Execution Environments: A Look under the Hood", 2014 2nd IEEE International Conference on Mobile Cloud Computing, Services, and Engineering (MobileCloud) (2014), total 8 pages.
GlobalPlatform Device Technology Trusted User Interface—Low Level API Version 0.0.0.14, dated Oct. 2015, total 52 pages.
GlobalPlatform Device Technology Trusted User Interface API Version 1.0.0.10, dated Oct. 2015, total 50 pages.

*Primary Examiner* — Jeffrey C Pwu
*Assistant Examiner* — Nega Woldemariam

(57) ABSTRACT

Embodiments of the present invention provide a security indication information configuration method and device, to reduce a risk of attack and interception from malicious software. The method includes: detecting, by a terminal, whether universal security indication information is set in the terminal for a TUI; detecting a running status of the terminal if no universal security indication information is set; when it is detected that the running status of the terminal is a secure state, presenting a first input interface on a display by using a first information presentation interface; and receiving input universal security indication information by using the first input interface, and saving the universal security indication information to a trusted execution environment TEE of the terminal.

20 Claims, 10 Drawing Sheets

(51) Int. Cl.
| | |
|---|---|
| *H04W 8/18* | (2009.01) |
| *H04M 1/7243* | (2021.01) |
| *H04M 1/72448* | (2021.01) |
| *G06F 21/44* | (2013.01) |
| *G06F 21/56* | (2013.01) |
| *G06F 21/71* | (2013.01) |
| *H04L 29/06* | (2006.01) |
| *G06F 21/74* | (2013.01) |

(52) U.S. Cl.
CPC .......... *H04L 63/10* (2013.01); *H04M 1/7243* (2021.01); *H04M 1/72448* (2021.01); *H04W 8/18* (2013.01); *G06F 21/74* (2013.01)

(58) Field of Classification Search
CPC ... H04W 12/04; H04L 63/10; G04M 1/72547; H04M 1/72563
USPC .......................................................... 726/23
See application file for complete search history.

(56) References Cited

U.S. PATENT DOCUMENTS

| | | |
|---|---|---|
| 2014/0095890 A1 | 4/2014 | Mangalore et al. |
| 2014/0344889 A1* | 11/2014 | Lee .................... G06F 21/54 |
| | | 726/1 |
| 2016/0330618 A1 | 11/2016 | Ren et al. |

FOREIGN PATENT DOCUMENTS

| | | |
|---|---|---|
| CN | 103856485 A | 6/2014 |
| CN | 104023032 A | 9/2014 |
| CN | 104125216 A | 10/2014 |
| CN | 104462942 A | 3/2015 |
| CN | 104754552 A | 7/2015 |
| CN | 104992082 A | 10/2015 |
| GB | 2421093 A | 6/2006 |
| WO | 2013188830 A1 | 12/2013 |

* cited by examiner

SECURITY INDICATION INFORMATION CONFIGURATION METHOD AND DEVICE

CROSS-REFERENCE TO RELATED APPLICATIONS

This application is a national stage of International Application No. PCT/CN2015/095573, filed on Nov. 25, 2015, which is hereby incorporated by reference in its entirety.

TECHNICAL FIELD

The present invention relates to the field of intelligent mobile terminals, and in particular, to a security indication information configuration method and device.

BACKGROUND

Development of mobile communications technologies brings rapid development of mobile terminal technologies. A conventional functional mobile terminal whose core is a baseband processor can hardly meet increasingly rich mobile service requirements of people. A development trend of a mobile terminal is to develop an intelligent mobile terminal that has an open high-order independent operating system, on which a mobile application developed by a third party can be installed, that can implement wireless access by using a mobile network, and that has a powerful processing capability and more storage space. An intelligent mobile terminal has developed into an open software platform on which various third-party applications can be downloaded from mobile internet and installed. In addition, requirements for the intelligent mobile terminal to process important services continuously increase. For example, functions such as a multimedia service, mobile phone remote payment, and bank account management are required. These development trends make the intelligent mobile terminal become an attack target of a virus such as malicious software or Trojan. Because a current intelligent mobile terminal lacks an overall protection mechanism, software and hardware of the current intelligent mobile terminal are prone to attack and modification. A security risk to the current intelligent mobile terminal is severer than a security risk to a PC terminal due to security vulnerability existing in an operating system and software with an illegal source.

A trusted execution environment (English full name: trusted execution environment, TEE for short) is a technical solution proposed by the Global Platform (English full name: Global Platform, GP for short) to resolve the problem of the security risk to the current intelligent mobile terminal. The TEE and a common execution environment, or referred to as a rich execution environment (English full name: Rich Execution Environment, REE for short), are operating environments that both exist in an intelligent terminal. The TEE is a security zone that exists on a primary processor of the intelligent terminal or is connected to the terminal. The TEE includes a trusted CPU core and trusted storage (RAM/ROM). Therefore, hardware for storing, processing, and protecting sensitive data in the TEE is isolated from that in a rich operating system (Rich OS), so that storage, processing, and protection of the sensitive data are isolated and trusted. Identity authentication needs to be performed to write data to the TEE. That is, to use the TEE of the terminal, an application developer needs to pass a relatively strict check of a terminal manager. Identity information authentication also needs to be performed before a program in the REE communicates with a trusted application in the TEE, so that a malicious program is prevented from entering the TEE and from causing damage to user personal information property in the TEE.

For a security risk in a current user interface (English full name: User Interface, UI for short) interaction process, for example, interception of a user password or a personal identification number (English full name: Personal Identification Number, PIN for short), or tampering of a display message, to securely interact with a user and securely present information to the user, a trusted user interface (English full name: Trusted User Interface, TUI for short) provided by the TEE is used as a bridge for communication between the user and the TEE, so as to provide a trusted input function and a trusted information presentation function for the user.

To differentiate between the TUI and another UI, the intelligent terminal needs to use security indication information (Security Indicator) to prompt the user that a terminal display interface is currently controlled by the TUI. There are two implementations of the security indication information. One implementation is security indication information controlled by hardware, for example, a light emitting diode (Light Emitting Diode, LED). The other implementation is particular text and image information that is presented in a particular zone on the TUI interface and that is known by only the user, for example, an image or a private question including a correct answer. In the first method, dedicated peripheral needs to be provided, and hardware needs to be changed. The second method is more widely used. In the second method, a problem of initializing security indication information urgently needs to be resolved.

Because the TEE can provide a more secure application operating environment for the user, the TEE has a wide application prospect in a terminal field. As one of the most important composition parts of the TEE, the TUI is a key part for communication between the terminal user and the TEE. Therefore, how to securely initialize security indication information to ensure that the user securely uses the TEE is extremely important to the user. If the security indication information cannot be securely initialized, the security indication information may be disclosed, and malicious software may forge a TUI by using intercepted security indication information, inducing the user to input personal sensitive information. This causes a result that the user sensitive information is obtained by the malicious software, resulting in a severe information and property security problem. Therefore, how to securely initialize the security indication information to reduce a risk of being attacked and intercepted by the malicious software is a technical problem that urgently needs to be resolved. Therefore, how to securely initialize the security indication information to reduce a risk of being attacked and intercepted by the malicious software is a technical problem that urgently needs to be resolved.

SUMMARY

Embodiments of the present invention provide a security indication information configuration method and device, to reduce a risk of attack and interception from malicious software.

According to a first aspect, a security indication information configuration method is provided, including:

detecting, by a terminal, whether universal security indication information is set in the terminal for a trusted user interface TUI;

detecting, by the terminal, a running status of the terminal when it is detected that no universal security indication information is set in the terminal for the TUI;

when it is detected that the running status of the terminal is a secure state, presenting, by the terminal, a first input interface on a display by using a first information presentation interface; and receiving, by the terminal, input universal security indication information by using the first input interface, and saving the universal security indication information to a trusted execution environment TEE of the terminal.

With reference to the first aspect, in a first possible implementation of the first aspect, when it is detected that universal security indication information is set in the terminal for the TUI, the method further includes:

when it is detected that a first trusted application stored in the TEE is installed, presenting, by the terminal after being started, the universal security indication information and a second input interface on the display by using the first information presentation interface;

receiving, by the terminal, input personalized security indication information of the first trusted application by using the second input interface; and saving, by the terminal, the personalized security indication information of the first trusted application to the TEE.

In this case, when it is detected that the universal security indication information is set in the terminal, and the first trusted application stored in the TEE is installed, the personalized security indication information can be set for the trusted application being installed, so as to further ensure that user information input by using the trusted application is not obtained by malicious software, and prompt, by using the set personalized security indication information, a user that an interface being used is secure. Therefore, user experience is improved.

With reference to the first aspect, in a second possible implementation of the first aspect, the detecting, by the terminal, a running status of the terminal when it is detected that no universal security indication information is set in the terminal for the TUI includes:

in a process of starting a trusted operating system of the terminal or when a rich operating system is not started after the trusted operating system is started, detecting, by the terminal, whether the universal security indication information is set in the terminal for the TUI; if it is detected that no universal security indication information is set in the terminal for the TUI, detecting whether the terminal is started for the first time; if the terminal is started for the first time, further detecting whether personalization of the terminal is completed; and if it is detected that the personalization of the terminal is completed, determining that the running status of the terminal is a first secure state, where the secure state includes the first secure state.

With reference to the first aspect, in a third possible implementation of the first aspect, the detecting, by the terminal, a running status of the terminal when it is detected that no universal security indication information is set in the terminal for the TUI includes:

in a process of starting a trusted operating system of the terminal or when a rich operating system is not started after the trusted operating system is started, detecting, by the terminal, whether the universal security indication information is set in the terminal for the TUI; if it is detected that no universal security indication information is set in the terminal for the TUI, detecting whether the terminal is started for the first time; if the terminal is started for the first time, further detecting whether personalization of the terminal is completed; and if it is detected that the personalization of the terminal is not completed, determining that the running status of the terminal is a second secure state, where the secure state includes the second secure state.

With reference to the first aspect, in a fourth possible implementation of the first aspect, the detecting, by the terminal, a running status of the terminal when it is detected that no universal security indication information is set in the terminal for the TUI includes:

in a process of starting a trusted operating system of the terminal or when a rich operating system is not started after the trusted operating system is started, detecting, by the terminal, whether the universal security indication information is set in the terminal for the TUI; if it is detected that no universal security indication information is set in the terminal for the TUI, detecting whether the terminal is started for the first time; and if the terminal is not started for the first time, determining that the running status of the terminal is a risk state, and presenting, on the display by using the first information presentation interface, prompt information for performing system reset on the terminal or for continuing starting.

With reference to any one of the first aspect or the foregoing possible implementations, in a fifth possible implementation of the first aspect, the detecting, by the terminal, a running status of the terminal when it is detected that no universal security indication information is set in the terminal for the TUI includes:

when both a trusted operating system and a rich operating system of the terminal are started, detecting, by the terminal, whether the universal security indication information is set in the terminal for the TUI; if it is detected that no universal security indication information is set in the terminal for the TUI, detecting whether an application with an illegal source is not installed on the terminal and system permission of the terminal is not obtained; if the application with an illegal source is not installed on the terminal and the system permission of the terminal is not obtained, further detecting whether personalization of the terminal is completed; and if it is detected that the personalization of the terminal is completed, determining that the running status of the terminal is a third secure state, where the secure state includes the third secure state.

With reference to any one of the first aspect or the foregoing possible implementations, in a sixth possible implementation of the first aspect, the detecting, by the terminal, a running status of the terminal when it is detected that no universal security indication information is set in the terminal for the TUI includes:

when both a trusted operating system and a rich operating system of the terminal are started, detecting, by the terminal, whether the universal security indication information is set in the terminal for the TUI; if it is detected that no universal security indication information is set in the terminal for the TUI, detecting whether an application with an illegal source is installed on the terminal and system permission of the terminal is obtained; and if the application with an illegal source is installed on the terminal or the system permission of the terminal is obtained, determining that the running status of the terminal is a risk state, and presenting, on the display by using the first information presentation interface, prompt information that the terminal is risky.

With reference to any one of the first aspect or the foregoing possible implementations, in a seventh possible implementation of the first aspect, when the terminal determines that the running status of the terminal is the first secure state or the third secure state, before the presenting, by the terminal, a first input interface on a display by using a first information presentation interface, the method further includes:

presenting, by the terminal, an identity authentication portal for a TEE access permission on the display by using a second information presentation interface; and performing, by the terminal, authentication on identity information received by using the identity authentication portal.

In this case, security indication information can be set only after identity information is successfully authenticated, so as to further ensure that an operating environment of the terminal is secure and trusted, and improve information security.

With reference to any one of the first aspect or the foregoing possible implementations, in an eighth possible implementation of the first aspect, when the terminal determines that the running status of the terminal is the second secure state, before the presenting, by the terminal, a first input interface on a display by using a first information presentation interface, the method further includes:

presenting, on the display by the terminal by using a second information presentation interface, prompt information for performing personalization on the terminal.

With reference to any one of the first aspect or the foregoing possible implementations, in a ninth possible implementation of the first aspect, after the receiving, by the terminal, input universal security indication information by using the first input interface, and saving the universal security indication information to a trusted execution environment TEE of the terminal, the method further includes:

configuring, by the terminal, an access permission of the universal security indication information for all trusted applications in the TEE, and setting a modification permission of the universal security indication information for the trusted operating system of the terminal.

With reference to any one of the first aspect or the foregoing possible implementations, in a tenth possible implementation of the first aspect, before the presenting, by the terminal, the universal security indication information and the second input interface on the display by using the first information presentation interface, the method further includes:

presenting, by the terminal, an identity authentication portal for a TEE access permission on the display by using a second information presentation interface.

With reference to any one of the first aspect or the foregoing possible implementations, in an eleventh possible implementation of the first aspect, after the saving, by the terminal, the personalized security indication information of the first trusted application to the TEE, the method further includes:

configuring both an access permission and a modification permission of the personalized security indication information of the first trusted application for the first trusted application and a trusted operating system of the terminal.

With reference to any one of the first aspect or the foregoing possible implementations, in a twelfth possible implementation of the first aspect, when the terminal determines that the universal security indication information is set in the terminal for the TUI, the method further includes:

detecting, by the terminal, whether there is an update request for first security indication information;

when an update request for the first security indication information is detected, presenting, by the terminal, the universal security indication information and an identity authentication portal for a TEE access permission on the display by using a second information presentation interface; and after identity information input from the identity authentication portal is successfully authenticated, presenting, by the terminal, an update portal of the first security indication information on the display by using the first information presentation interface;

receiving, by the terminal, newly-input first security indication information by using the update portal;

saving, by the terminal, the newly-input first security indication information to the TEE of the terminal, and configuring a corresponding access permission and a corresponding modification permission for the new first security indication information; and presenting, on the display by the terminal by using the first information presentation interface, the new first security indication information and prompt information that the first security indication information is successfully modified, where the first security indication information is the universal security indication information or personalized security indication information of any application.

In this way, security indication information set by a user is updated according to an update request for security indication information of the user, to facilitate the user to update the security indication information in time, so as to further improve user experience. In addition, after the security indication information is disclosed, information security of the user can be ensured by modifying the security indication information in time.

With reference to any one of the first aspect or the foregoing possible implementations, in a thirteenth possible implementation of the first aspect, the first information presentation interface and the second information presentation interface are a same interface or different interfaces, and both are TUIs of the terminal or command-line interfaces controlled by the trusted operating system of the terminal.

According to a second aspect, a security indication information configuration method for a trusted application is provided, including:

when a first trusted application is installed in a trusted execution environment TEE, detecting, by a terminal, whether universal security indication information is set in the terminal for a TUI;

when it is detected that no universal security indication information is set in the terminal, detecting, by the terminal, whether personalized security indication information is set for at least one trusted application in all trusted applications installed in the TEE of the terminal;

if the personalized security indication information is set for the at least one trusted application in all the trusted applications installed in the TEE of the terminal, presenting first security indication information and a first input interface on a display by using a first information presentation interface, where the first security indication information is personalized security indication information of one of the at least one trusted application;

receiving, by the terminal, personalized security indication information of the first trusted application by using the first input interface; and saving, by the terminal, the personalized security indication information of the first trusted application to the TEE.

In this case, personalized security indication information set for another trusted application in the TEE is used to indicate that a setting interface of the personalized security indication information of the first TA is secure, so that the personalized security indication information of the first TA can be securely set for the first TA, and information security of a user can be ensured.

With reference to the second aspect, in a first possible implementation of the second aspect, when it is detected that the universal security indication information is set in the terminal, the method further includes:

presenting, by the terminal, the universal security indication information and a second input interface on the display by using the first information presentation interface;

receiving, by the terminal, the personalized security indication information of the first trusted application by using the second input interface; and saving, by the terminal, the personalized security indication information of the first trusted application to the TEE.

With reference to the second aspect, in a second possible implementation of the second aspect, before the presenting, by the terminal, first security indication information and a first input interface on a display by using a first information presentation interface, the method further includes:

presenting, by the terminal, an identity authentication portal for an access permission of the first security indication information on the display by using a second information presentation interface.

With reference to the second aspect, in a third possible implementation of the second aspect, before the presenting, by the terminal, the universal security indication information and a first input interface on a display by using a first information presentation interface, the method further includes:

presenting, by the terminal, an identity authentication portal for a TEE access permission on the display by using the second information presentation interface.

With reference to any one of the second aspect or the foregoing possible implementations, in a fourth possible implementation of the second aspect, after the saving, by the terminal, the personalized security indication information of the first trusted application to the TEE, the method further includes:

configuring both an access permission and a modification permission of the personalized security indication information of the first trusted application for the first trusted application and a trusted operating system of the terminal.

With reference to any one of the second aspect or the foregoing possible implementations, in a fifth possible implementation of the second aspect, after the saving, by the terminal, the personalized security indication information of the first trusted application to the TEE of the terminal, the method further includes:

detecting, by the terminal, whether there is an update request for the personalized security indication information of the first trusted application;

when an update request for the personalized security indication information of the first trusted application is detected, presenting, by the terminal, the personalized security indication information of the first trusted application and an identity authentication portal for an access permission of the first trusted application on the display by using the second information presentation interface; and after identity information input from the identity authentication portal for the access permission of the first trusted application is successfully authenticated, presenting, by the terminal, an update portal of the first security indication information on the display by using the first information presentation interface;

receiving, by the terminal, newly-input personalized security indication information of the first trusted application by using the update portal;

saving, by the terminal, the newly-input personalized security indication information of the first trusted application to the TEE of the terminal, and configuring an access permission and a modification permission of the new personalized security indication information of the first trusted application; and presenting, on the display by the terminal by using the first information presentation interface, the new personalized security indication information of the first trusted application and prompt information that the personalized security indication information of the first trusted application is successfully modified.

With reference to any one of the second aspect or the foregoing possible implementations, in a sixth possible implementation of the second aspect, the first information presentation interface and the second information presentation interface are a same interface or different interfaces, and both are TUIs of the terminal or command-line interfaces controlled by the trusted operating system of the terminal.

According to a third aspect, a security indication information configuration apparatus is provided, including:

a first detection unit, configured to detect whether universal security indication information is set in a terminal for a trusted user interface TUI, where the first detection unit is further configured to detect a running status of the terminal when it is detected that no universal security indication information is set in the terminal for the TUI;

a first display unit, configured to: when it is detected that the running status of the terminal is a secure state, present a first input interface on a display by using a first information presentation interface; and a first receiving unit, configured to receive input universal security indication information by using the first input interface, and save the universal security indication information to a trusted execution environment TEE of the terminal.

With reference to the third aspect, in a first possible implementation of the third aspect, when the first detection unit detects that the universal security indication information is set in the terminal for the TUI, the first display unit is further configured to: when the terminal after being started detects that a first trusted application stored in the TEE is installed, present the universal security indication information and a second input interface on the display by using the first information presentation interface; and the first receiving unit is further configured to receive input personalized security indication information of the first trusted application by using the second input interface, and save the personalized security indication information of the first trusted application to the TEE.

In this case, when it is detected that the universal security indication information is set in the terminal, and the first trusted application stored in the TEE is installed, the personalized security indication information can be set for the trusted application being installed, so as to further ensure that user information input by using the trusted application is not obtained by malicious software, and prompt, by using the set personalized security indication information, a user that an interface being used is secure. Therefore, user experience is improved.

With reference to the third aspect, in a second possible implementation of the third aspect, when detecting the running status of the terminal, the first detection unit is specifically configured to:

in a process of starting a trusted operating system of the terminal or when a rich operating system is not started after the trusted operating system is started, detect whether the universal security indication information is set in the terminal for the TUI; if it is detected that no universal security indication information is set in the terminal for the TUI, detect whether the terminal is started for the first time; if the terminal is started for the first time, further detect whether personalization of the terminal is completed; and if it is detected that the personalization of the terminal is completed, determine that the running status of the terminal is a first secure state, where the secure state includes the first secure state.

With reference to the third aspect, in a third possible implementation of the third aspect, when detecting the running status of the terminal, the first detection unit is specifically configured to:

in a process of starting a trusted operating system of the terminal or when a rich operating system is not started after the trusted operating system is started, detect whether the universal security indication information is set in the terminal for the TUI; if it is detected that no universal security indication information is set in the terminal for the TUI, detect whether the terminal is started for the first time; if the terminal is started for the first time, further detect whether personalization of the terminal is completed; and if it is detected that the personalization of the terminal is not completed, determine that the running status of the terminal is a second secure state, where the secure state includes the second secure state.

With reference to the third aspect, in a fourth possible implementation of the third aspect, when detecting the running status of the terminal, the first detection unit is specifically configured to:

in a process of starting a trusted operating system of the terminal or when a rich operating system is not started after the trusted operating system is started, detect whether the universal security indication information is set in the terminal for the TUI; if it is detected that no universal security indication information is set in the terminal for the TUI, detect whether the terminal is started for the first time; and if the terminal is not started for the first time, determine that the running status of the terminal is a risk state, and present, on the display by using the first information presentation interface, prompt information for performing system reset on the terminal or for continuing starting.

With reference to the third aspect, in a fifth possible implementation of the third aspect, when detecting the running status of the terminal, the first detection unit is specifically configured to:

when both a trusted operating system and a rich operating system of the terminal are started, detect whether the universal security indication information is set in the terminal for the TUI; if it is detected that no universal security indication information is set in the terminal for the TUI, detect whether an application with an illegal source is not installed on the terminal and system permission of the terminal is not obtained; if the application with an illegal source is not installed on the terminal and the system permission of the terminal is not obtained, further detect whether personalization of the terminal is completed; and if it is detected that the personalization of the terminal is completed, determine that the running status of the terminal is a third secure state, where the secure state includes the third secure state.

With reference to any one of the third aspect or the foregoing possible implementations, in a sixth possible implementation of the third aspect, when detecting the running status of the terminal, the first detection unit is specifically configured to:

when both a trusted operating system and a rich operating system of the terminal are started, detect whether the universal security indication information is set in the terminal for the TUI; if it is detected that no universal security indication information is set in the terminal for the TUI, detect whether an application with an illegal source is not installed on the terminal and system permission of the terminal is not obtained; and if the application with an illegal source is installed on the terminal or the system permission of the terminal is obtained, determine that the running status of the terminal is a risk state, and present, on the display by using the first information presentation interface, prompt information that the terminal is risky.

With reference to any one of the third aspect or the foregoing possible implementations, in a seventh possible implementation of the third aspect, when the first detection unit determines that the running status of the terminal is the first secure state or the third secure state, before presenting the first input interface on the display by using the first information presentation interface, the first display unit is further configured to:

present an identity authentication portal for a TEE access permission on the display by using a second information presentation interface; and perform authentication on identity information received by using the identity authentication portal.

In this case, security indication information can be set only after identity information is successfully authenticated, so as to further ensure that an operating environment of the terminal is secure and trusted, and improve information security.

With reference to any one of the third aspect or the foregoing possible implementations, in an eighth possible implementation of the third aspect, when the first detection unit determines that the running status of the terminal is the second secure state, before presenting the first input interface on the display by using the first information presentation interface, the first display unit is further configured to:

present, on the display by using a second information presentation interface, prompt information for performing personalization on the terminal.

With reference to any one of the third aspect or the foregoing possible implementations, in a ninth possible implementation of the third aspect, after receiving the input universal security indication information by using the first input interface, and saving the universal security indication information to the trusted execution environment TEE of the terminal, the first receiving unit is further configured to:

configure an access permission of the universal security indication information for all trusted applications in the TEE, and set a modification permission of the universal security indication information for the trusted operating system of the terminal.

With reference to any one of the third aspect or the foregoing possible implementations, in a tenth possible implementation of the third aspect, before presenting the universal security indication information and the second input interface on the display by using the first information presentation interface, the second display unit is further configured to:

present an identity authentication portal for a TEE access permission on the display by using a second information presentation interface.

With reference to any one of the third aspect or the foregoing possible implementations, in an eleventh possible implementation of the third aspect, after saving the personalized security indication information of the first trusted application to the TEE, the first receiving unit is further configured to:

configure both an access permission and a modification permission of the personalized security indication information of the first trusted application for the first trusted application and a trusted operating system of the terminal.

With reference to any one of the third aspect or the foregoing possible implementations, in a twelfth possible implementation of the third aspect, when determining that the universal security indication information is set in the terminal for the TUI, the first detection unit is further configured to:

detect whether there is an update request for first security indication information;

the first display unit is further configured to: when the first detection unit detects an update request for the first security indication information, present the universal security indication information and an identity authentication portal for a TEE access permission on the display by using a second information presentation interface; and after identity information input from the identity authentication portal is successfully authenticated, present an update portal of the first security indication information on the display by using the first information presentation interface;

the first receiving unit is further configured to receive newly-input first security indication information by using the update portal, save the newly-input first security indication information to the TEE of the terminal, and configure a corresponding access permission and a corresponding modification permission for the new first security indication information; and the first display unit is further configured to present, on the display by using the first information presentation interface, the new first security indication information and prompt information that the first security indication information is successfully modified, where the first security indication information is the universal security indication information or personalized security indication information of any application.

In this way, security indication information set by a user is updated according to an update request for security indication information of the user, to facilitate the user to update the security indication information in time, so as to further improve user experience. In addition, after the security indication information is disclosed, information security of the user can be ensured by modifying the security indication information in time.

With reference to any one of the third aspect or the foregoing possible implementations, in a thirteenth possible implementation of the third aspect, the first information presentation interface and the second information presentation interface are a same interface or different interfaces, and both are TUIs of the terminal or command-line interfaces controlled by the trusted operating system of the terminal.

According to a fourth aspect, a security indication information configuration apparatus for a trusted application is provided, including:

a second detection unit, configured to: when a first trusted application is installed in a trusted execution environment TEE, detect whether universal security indication information is set in the terminal for a TUI, where the second detection unit is further configured to: when it is detected that no universal security indication information is set in the terminal, detect whether personalized security indication information is set for at least one trusted application in all trusted applications installed in the TEE of the terminal;

a second display unit, configured to: when the second detection unit detects that the personalized security indication information is set for the at least one trusted application in all the trusted applications installed in the TEE of the terminal, present first security indication information and a first input interface on a display by using a first information presentation interface, where the first security indication information is personalized security indication information of one of the at least one trusted application; and a second receiving unit, configured to receive personalized security indication information of the first trusted application by using the first input interface, and save the personalized security indication information of the first trusted application to the TEE.

In this case, personalized security indication information set for another trusted application in the TEE is used to indicate that a setting interface of the personalized security indication information of the first TA is secure, so that the personalized security indication information of the first TA can be securely set for the first TA, and information security of a user can be ensured.

With reference to the fourth aspect, in a first possible implementation of the fourth aspect, when the second detection unit detects that the universal security indication information is set in the terminal, the second display unit is further configured to:

present the universal security indication information and a second input interface on the display by using the first information presentation interface; and the second receiving unit is further configured to receive the personalized security indication information of the first trusted application by using the second input interface, and save the personalized security indication information of the first trusted application to the TEE.

With reference to the fourth aspect, in a second possible implementation of the fourth aspect, before presenting the first security indication information and the first input interface on the display by using the first information presentation interface, the second display unit is further configured to:

present an identity authentication portal for an access permission of the first security indication information on the display by using a second information presentation interface.

With reference to the fourth aspect, in a third possible implementation of the fourth aspect, before presenting the universal security indication information and the first input interface on the display by using the first information presentation interface, the second display unit is further configured to:

present an identity authentication portal for a TEE access permission on the display by using the second information presentation interface.

With reference to any one of the fourth aspect or the foregoing possible implementations, in a fourth possible implementation of the fourth aspect, after saving the personalized security indication information of the first trusted application to the TEE, the second receiving unit is further configured to:

configure both an access permission and a modification permission of the personalized security indication information of the first trusted application for the first trusted application and a trusted operating system of the terminal.

With reference to any one of the fourth aspect or the foregoing possible implementations, in a fifth possible implementation of the fourth aspect, after the second receiving unit saves the personalized security indication information of the first trusted application to the TEE, the second detection unit is further configured to:

detect whether there is an update request for the personalized security indication information of the first trusted application;

the second display unit is further configured to: when the second detection unit detects an update request for the personalized security indication information of the first trusted application, present the personalized security indication information of the first trusted application and an identity authentication portal for an access permission of the first trusted application on the display by using the second information presentation interface; and after identity information input from the identity authentication portal for the access permission of the first trusted application is successfully authenticated, present an update portal of the first security indication information on the display by using the first information presentation interface;

the second receiving unit is further configured to receive newly-input personalized security indication information of the first trusted application by using the update portal; and save the newly-input personalized security indication information of the first trusted application to the TEE of the terminal; and the second display unit is further configured to present, on the display by using the first information presentation interface, the new personalized security indication information of the first trusted application and prompt information that the personalized security indication information of the first trusted application is successfully modified.

With reference to any one of the fourth aspect or the foregoing possible implementations, in a sixth possible implementation of the fourth aspect, the first information presentation interface and the second information presentation interface are a same interface or different interfaces, and both are TUIs of the terminal or command-line interfaces controlled by the trusted operating system of the terminal.

According to a fifth aspect, a terminal is provided, including:

a display;

a memory, where the memory stores a program instruction; and at least one processor, configured to execute the program instruction, where the program instruction includes:

detecting whether universal security indication information is set in the terminal for a trusted user interface TUI;

detecting a running status of the terminal when it is detected that no universal security indication information is set in the terminal for the TUI;

when it is detected that the running status of the terminal is a secure state, presenting a first input interface on a display by using a first information presentation interface; and receiving input universal security indication information by using the first input interface, and saving the universal security indication information to a trusted execution environment TEE of the terminal.

According to a sixth aspect, a terminal is provided, including:

a display;

a memory, where the memory stores a program instruction; and at least one processor, configured to execute the program instruction, where the program instruction includes:

when a first trusted application is installed in a trusted execution environment TEE of the terminal, detecting whether universal security indication information is set in the terminal for a TUI;

when it is detected that no universal security indication information is set in the terminal, detecting whether personalized security indication information is set for at least one trusted application in all trusted applications installed in the TEE of the terminal;

if the personalized security indication information is set for the at least one trusted application in all the trusted applications installed in the TEE of the terminal, presenting first security indication information and a first input interface on a display by using a first information presentation interface, where the first security indication information is personalized security indication information of one of the at least one trusted application;

receiving personalized security indication information of the first trusted application by using the first input interface; and saving the personalized security indication information of the first trusted application to the TEE.

Beneficial effects of the present invention are as follows:

The embodiments of the present invention provide a security indication information configuration solution. The method includes: detecting, by a terminal, whether universal security indication information is set in the terminal for a TUI; detecting, by the terminal, a running status of the terminal when it is detected that no universal security indication information is set in the terminal for the TUI; when it is detected that the running status of the terminal is a secure state, presenting, by the terminal, a first input interface on a display by using a first information presentation interface; and receiving, by the terminal, input universal security indication information by using the first input interface, and saving the universal security indication information to a trusted execution environment TEE of the terminal. In this way, after detecting that no universal security indication information is set in the terminal, the terminal detects the running status of the terminal before the universal security indication information is set. The universal security indication information is set only when it is ensured that the running status of the terminal is the secure state. In this way, it can be ensured that the set universal security indication information is not attacked or obtained by malicious software or a malicious program, so as to ensure information security of a user.

DESCRIPTION OF EMBODIMENTS

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
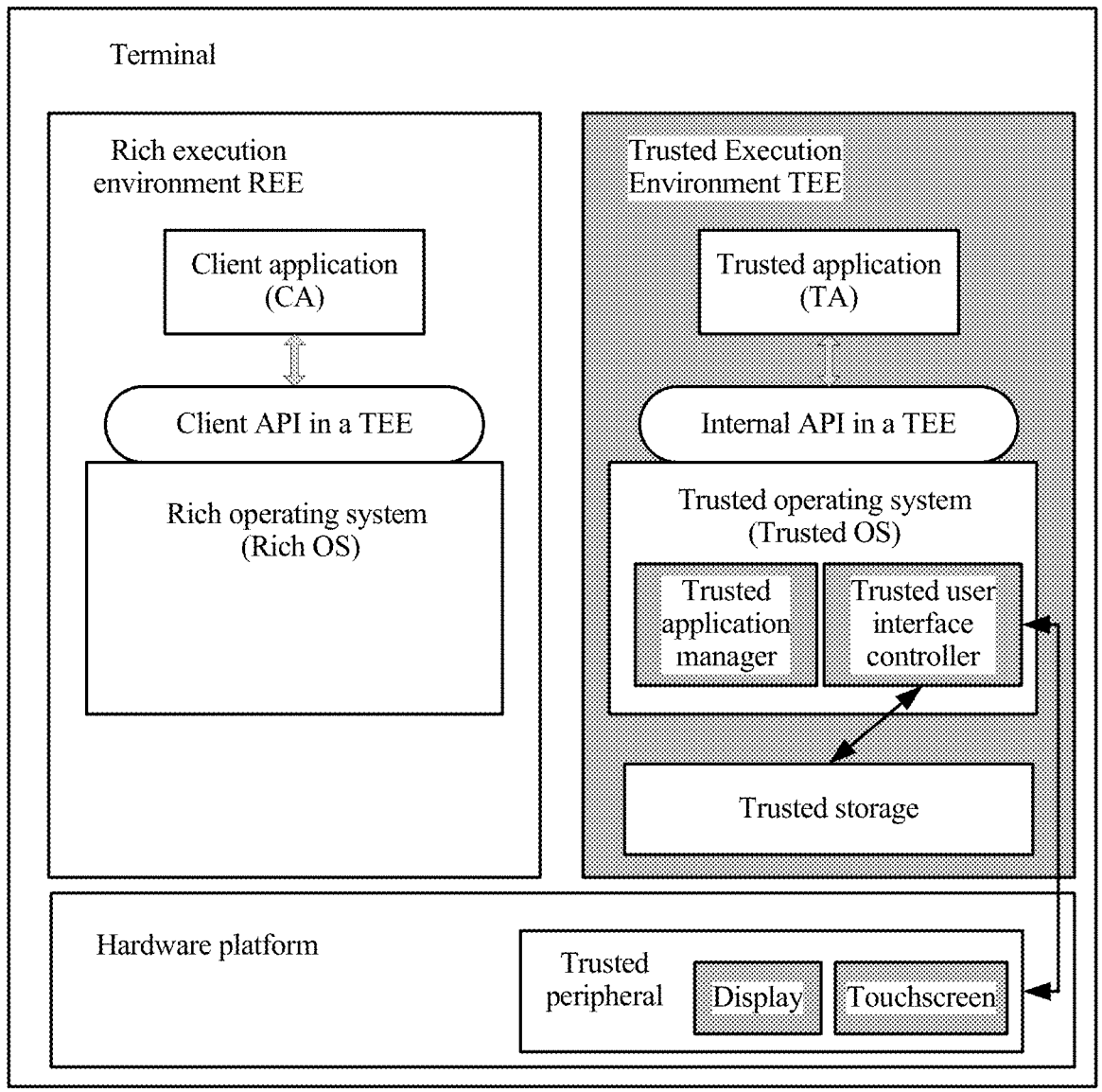
FIG. 1 is a schematic architectural diagram of a TEE of a terminal according to an embodiment of the present invention.

To securely interact with a user, securely present information to the user, and receive input of the user by using a trusted interface, a TUI and a related interface are implemented in a TEE. FIG. 1 shows a schematic architectural diagram of a TEE of a terminal. The TEE includes a trusted application (English full name: Trusted Application, TA for short) manager and a TUI controller.

The TA manager serves as a system application or a system function module of a trusted operating system (English full name: Operating System, OS for short). The TA manager is configured to manage a trusted application installed in the trusted OS, save configuration information of the trusted application, and provide a necessary TUI interface for a TA installation process.

The TUI controller serves as a system application or a system function module of the trusted OS. The TUI controller is configured to manage a TUI resource, for example, a trusted peripheral such as a display or a touchscreen, and a necessary software module related to the peripheral. The TUI controller further saves a TUI resource access rule. When a TA sends a request to the TUI controller, the TUI resource access rule is checked to determine whether the TA can access a TUI resource and determine which TUI resource the TA can access.

The TEE and a REE in FIG. 1 are two program running environments that both exist in the terminal. The TEE and the REE may be referred to as terminal environments, and separately include hardware resources such as a memory and a processor, and software such as an operating system and a framework (Framework). The REE does not strictly limit a source of an application. If the user permits, the REE can accept installation of software from any source. However, the TEE is different. Storage in the TEE is secure storage.

The TEE is managed by a TEE distributor such as a terminal vendor or an operator, and is limited to a specific access condition. When the terminal receives a request for accessing the TEE storage, for example, reading or writing secure storage (for example, installing a program in the TEE belongs to a secure storage write operation), whether a security access rule is met needs to be verified. Corresponding storage content can be accessed only when the security access rule is met. Due to the foregoing feature of the TEE, a malicious program cannot access a program installed in the TEE and data of the program. A program installed in the TEE environment cannot perform out-of-bounds access on data that does not belong to the program. Therefore, a security level is relatively high.

An operating system running in the TEE is referred to as a trusted operating system (Trusted Operating System, also referred to as a trusted OS). A TA is an application that is designed and implemented by a developer and that can only be installed or only run in the TEE after the application is checked. In addition, the TA can provide security-related functions such as a password service, a signature service, and an abstract service for a client application (English full name: Client Application, CA for short) in the REE or another trusted application in the TEE environment. Correspondingly, the client application is an application that runs in the REE and that can communicate with a trusted application TA in the TEE by using a TEE client application programming interface or a shared memory mechanism and call a service provided by the TA.

A TUI is an interaction interface that is entirely controlled by the TEE environment. A TUI screen is entirely controlled by the TEE and is isolated from the REE environment and even the TA. A display software resource controlled by the TEE and hardware such as a display (Display) and a touchscreen (Touch Screen) controlled by the TEE jointly form the TUI, so as to provide a trusted information input and information display interface for the user. For ease of description, a related software and hardware management module for implementing a TUI function in the TEE is referred to as the TUI controller.

In principle, for the TEE in FIG. 1, it needs to be ensured that only one TA can obtain the TUI resource and interact with the user, and another TA and even any application in a rich OS cannot access the TUI resource, so as to ensure reliability and security of a user interface.

Therefore, secure interaction between a terminal and a user can be implemented by using the TUI interface, and security indication information further needs to be used to prompt the user that a terminal display interface is currently controlled by the TUI. How to initialize the security indication information is an extremely important problem. Initialization of the security indication information is first configuration of the security indication information. User information security can be further ensured only if malicious software can be prevented from attacking and intercepting the input security indication information when the security indication information is configured for the first time.

Figure 2:
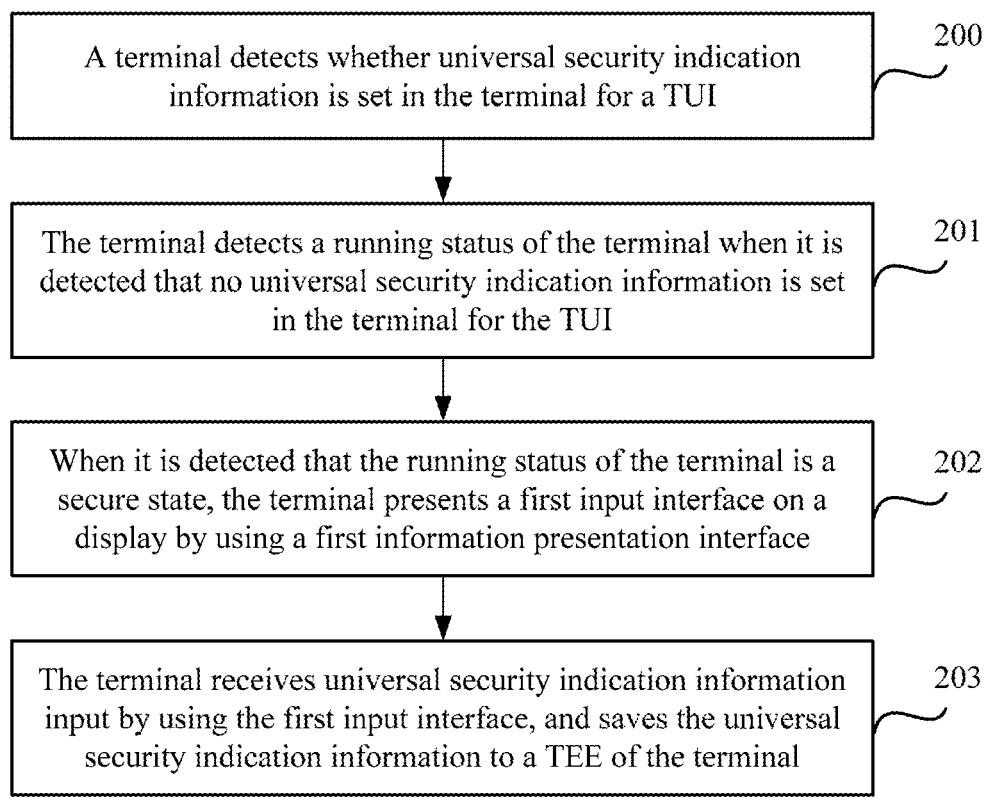
FIG. 2 is a flowchart of a security indication information configuration method according to an embodiment of the present invention.

Based on the schematic architectural diagram of the TEE of the terminal shown in FIG. 1, referring to FIG. 2, an embodiment of the present invention provides a security indication information configuration method. A specific process is as follows.

Step 200: A terminal detects whether universal security indication information is set in the terminal for a TUI.

It should be noted that the universal security indication information is displayed on a user interface, and is used to indicate that a current display interface is the TUI, so as to prompt a user that the current interface is trusted and secure. Personal information of the user can be securely input by using the current interface without being thieved by malicious software. Therefore, information security can be ensured.

The universal security indication information is security indication information that can be used by a trusted OS and all trusted applications installed in a TEE, and is security indication information that is presented on the TUI to indicate the TUI when the trusted system or a trusted application calls the TUI interface. In addition, modification of the universal security indication information needs an access permission of the TEE instead of an access permission of a trusted application.

Step 201: The terminal detects a running status of the terminal when it is detected that no universal security indication information is set in the terminal for the TUI.

Before universal security indication information is set, detection for the running status of the terminal is performed to ensure that the terminal is in a secure running status when security indication information is set, so that the malicious software can be prevented from thieving the set security indication information and thieving the personal information of the user by using the thieved security indication information to forge a trusted user interface.

When the terminal detects the running status of the terminal, there are the following two detection scenarios.

A first detection scenario is as follows: In a process of starting a trusted operating system of the terminal or when a rich operating system is not started after the trusted operating system is started, the terminal detects whether universal security indication information is set in the terminal for the TUI, and detects the running status of the terminal if it is detected that no universal security indication information is set in the terminal for the TUI. In this case, the terminal detects whether the terminal is started for the first time, and whether personalization of the terminal is completed.

Personalization (Personalization) configuration is a process in which a distributor or a manager of secure hardware such as a smart card, a security unit, and the TEE downloads system application information and cardholder information to the secure hardware, for example, a password used by a cardholder to access the secure hardware, the personal information of the user, and a key used by the secure hardware, so as to make the secure hardware available. Personalization may be performed before delivery of the secure hardware, or the personalization configuration may be completed by downloading the foregoing information to the terminal in an over the air (English full name: Over The Air, OTA for short) activation manner. In the present invention, the personalization of the terminal is personalization of the TEE of the terminal.

Further, if the terminal detects that the terminal is started for the first time, and the personalization of the terminal is completed, in this case, the running status of the terminal is a first secure state. The secure state includes the first secure state.

If the terminal detects that the terminal is started for the first time, and the personalization of the terminal is not completed, in this case, the running status of the terminal is a second secure state. The secure state includes the second secure state.

If the terminal detects that the terminal is not started for the first time, regardless of whether the personalization of the terminal is completed, in this case, the running status of the terminal is a risk state. In this case, prompt information for performing system reset on the terminal or continuing starting is presented on a display by using the preset first information presentation interface.

A second detection scenario is as follows: When both a trusted operating system and a rich operating system of the terminal are started, the terminal detects whether the universal security indication information is set in the terminal for the TUI, and detects the running status of the terminal if it is detected that no universal security indication information is set in the terminal for the TUI. In this case, the terminal detects whether an application with an illegal source is not installed on the terminal and system permission of the terminal is not obtained, and detects whether personalization of the terminal is completed.

The system permission herein is root access of the terminal, and includes all permissions of the terminal, for example, starting or stopping a process, deleting or adding a user, and adding or disabling hardware. Some malicious software needs the root access to run a specific function. Whether the user releases the root access or a malicious program obtains the root access by using a particular means, a result is that the malicious software obtains the system permission, and can execute a function of thieving user information in the malicious software, for example, screen monitoring, and phishing by forging an interface.

Further, when it is detected that the application with an illegal source is not installed on the terminal and the system permission of the terminal is not obtained, if the terminal detects that the personalization of the terminal is completed, in this case, the running status of the terminal is a third secure state. The secure state includes the third secure state.

The application with an illegal source is an application installed in an approach other than an application market originally in the terminal.

If the terminal detects that the application with an illegal source is installed on the terminal or the system permission of the terminal is obtained, in this case, the running status of the terminal is a risk state. In this case, prompt information that the terminal is risky is presented on a display by using the first information presentation interface.

Therefore, the secure state in this embodiment of the present invention is used to describe a terminal running status with a relatively low possibility that a malicious program exists in the terminal. A lower possibility of existence of a malicious program indicates a securer running environment of the terminal.

The first secure state is corresponding to a case in which the secure hardware TEE is correctly personalized and is started for the first time. In this case, a possibility of existence of malicious software is nearly 0, and this is a highest security level.

The second secure state is corresponding to a case in which the secure hardware TEE is started for the first time but the TEE is not personalized. A following TEE personalization process may affect the terminal, or communication between the terminal and a remote server may be not secure enough due to a lack of a key configured in the personalization process. However, in conclusion, a possibility of existence of malicious software is also relatively low in this case. There may be malicious software in a following operation because communication is not secure enough. Therefore, the second secure state is an intermediate security level.

For the third secure state, a requirement is further reduced. The terminal is considered as secure if root is not obtained, and no software from an illegal application market is installed. A security level is lower than the foregoing two levels, and is a lowest security level.

Step 202: When it is detected that the running status of the terminal is a secure state, the terminal presents a first input interface on a display by using a first information presentation interface.

The secure state includes the first secure state, the second secure state, and the third secure state.

Specifically, when it is detected that the running status of the terminal is the secure state, the terminal presents the first input interface on the display by using the first information presentation interface. The following two display cases are included.

A first display case is as follows: When the terminal determines that the running status of the terminal is the first secure state or the third secure state, the terminal presents an identity authentication portal for an access permission of the TEE on the display by using a second information presentation interface. After the terminal successfully authenticates identity information input from the identity authentication portal, the terminal presents the first input interface on the display by using the first information presentation interface.

A second display case is as follows: When the terminal determines that the running status of the terminal is the second secure state, the terminal presents, on the display by using a second information presentation interface, prompt information for performing personalization on the terminal, and presents the first input interface on the display by using the first information presentation interface.

It should be noted that the first information presentation interface and the second information presentation interface are a same interface or different interfaces, and both are TUIs of the terminal or command-line interfaces controlled by the trusted operating system of the terminal.

Step 203: The terminal receives universal security indication information input by using the first input interface, and saves the universal security indication information to a TEE of the terminal.

Specifically, after the terminal receives the universal security indication information input by the user by using the first input interface, and saves the universal security indication information to the TEE of the terminal, the terminal further needs to perform the following operation:

configuring, by the terminal, an access permission of the universal security indication information for all trusted applications in the TEE, and setting a modification permission of the universal security indication information for the trusted operating system of the terminal.

Further, in step 200, when the terminal detects that universal security indication information is set in the terminal for the TUI, the terminal continues a start process.

When the terminal after being started detects that a first TA stored in the TEE is installed, the terminal presents an identity authentication portal for a TEE access permission on the display by using a second information presentation interface. Optionally, in this case, the set universal security indication information is further presented when the identity authentication portal for the TEE access permission is presented on the display by using the second information presentation interface. After successfully authenticating identity information input from the identity authentication portal, the terminal presents the universal security indication information and a second input interface on the display by using the first information presentation interface.

The terminal receives personalized security indication information of the first TA that is input by the user by using the second input interface.

The terminal saves the personalized security indication information of the first TA to the TEE, and configures an access permission and a modification permission of the personalized security indication information of the first TA.

Further, after the terminal saves the personalized security indication information of the first trusted application to the TEE, the terminal further needs to configure the access permission and the modification permission of the personalized security indication information of the first TA. Specifically, the terminal configures both the access permission and the modification permission of the personalized security indication information of the first TA for the first TA and the trusted operating system of the terminal.

The foregoing personalized security indication information is security indication information for a specific TA, and is usually set by the user. When a trusted application uses the TUI, the personalized security indication information is displayed on the TUI to only prompt the user that a currently used interface is the TUI.

In addition, the universal security indication information can be read by all TAs, but can only be modified by using system permission of the TEE. However, the personalized security indication information for the TA can be read and modified by both the TA and the trusted OS.

Further, after the terminal saves the personalized security indication information of the first TA to the TEE of the terminal, the method further includes:

detecting, by the terminal, whether there is an update request for first security indication information;

when an update request for the first security indication information is detected, presenting, by the terminal, the universal security indication information and an identity authentication portal for a TEE access permission on the display by using a second information presentation interface; and after identity information input from the identity authentication portal is successfully authenticated, presenting, by the terminal, an update portal of the first security indication information on the display by using the first information presentation interface;

receiving, by the terminal, newly-input first security indication information by using the update portal;

saving, by the terminal, the newly-input first security indication information to the TEE of the terminal, and configuring a corresponding access permission and a corresponding modification permission for the new first security indication information; and presenting, on the display by the terminal by using the first information presentation interface, the new first security indication information and prompt information that the first security indication information is successfully modified, where the first security indication information is the universal security indication information or personalized security indication information of any application.

Based on the hardware architecture of the terminal in FIG. 1, the following describes the method in FIG. 2 in detail by using four embodiments.

Embodiment 1

Figure 3:
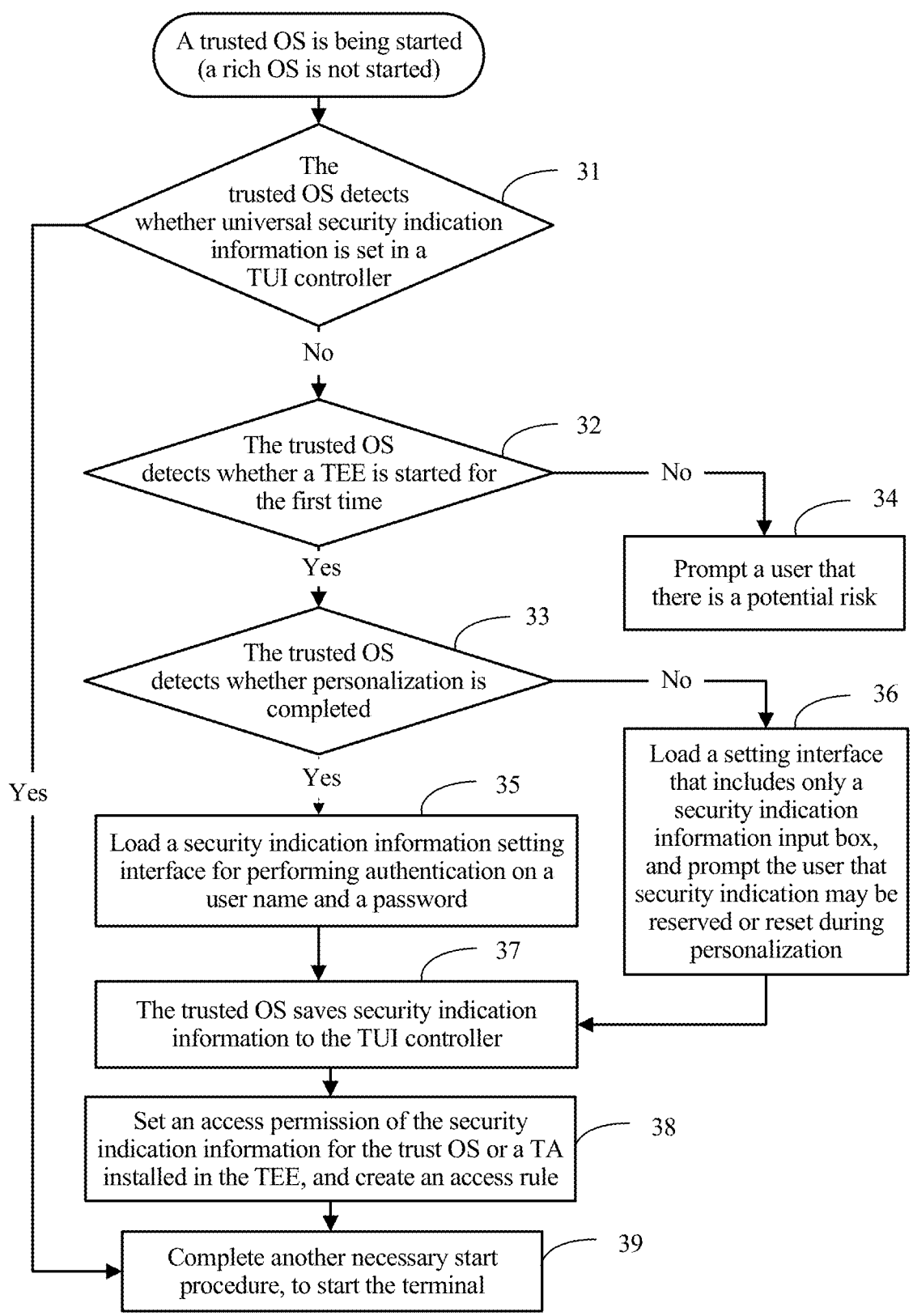
FIG. 3 is a flowchart of configuring universal security indication information according to Embodiment 1 of the present invention.

A running scenario of a terminal in Embodiment 1 is as follows: Each time the terminal is started, for a specific universal security indication information configuration procedure of the terminal in a process of starting a trusted operating system of the terminal or when a rich operating system is not started after the trusted operating system is started, refer to FIG. 3.

Step 31: The trusted OS of the terminal detects whether universal security indication information is set in a TUI controller; and step 39 is performed if the universal security indication information is set in the TUI controller; or step 32 is performed if the universal security indication information is not set in the TUI controller.

Step 32: The trusted OS of the terminal detects whether a TEE is started for the first time, and may specifically determine whether the TEE is started for the first time by detecting whether a hardware circuit is fused; and step 33 is performed if the TEE is started for the first time; or step 34 is performed if the TEE is not started for the first time.

Step 33: The trusted OS of the terminal detects whether personalization setting of the TEE is completed; and step 35 is performed if the personalization setting of the TEE is completed; or step 36 is performed if the personalization setting of the TEE is not completed.

Step 34: In this case, the terminal prompts a user that there is a potential risk for the terminal, and presents prompt information for performing system reset on the terminal or for continuing starting.

Step 35: The terminal presents a universal security indication information setting page to the user, where the setting page includes at least a "universal security indication information input box" and a "user identity authentication information input box"; and then step 37 is performed, where the user identity authentication information input box may include a user name and a password input box, and a user name and a password for a TEE access permission that are set during the TEE personalization need to be input to the "user identity authentication information input box" in this case.

Step 36: The terminal presents a universal security indication information setting page to the user, where the setting page includes only a "universal security indication information input box"; and before displaying the setting interface, the terminal may further prompt the user that information set in this case may be reserved or reset during the personalization, or prompt the user that the terminal is risky, and prompt the user to perform TEE personalization setting.

It should be noted that the universal indication information setting page in step 35 and step 36 may be a TUI that the trusted OS requests the TUI controller to display, or may be another relatively simple text interface controlled by the trusted OS. The interface may include security indication information preset by a TEE vendor, or may not include any security indication information.

Step 37: The trusted OS of the terminal receives universal security indication information set by the user, and saves the universal security indication information to the TEE. Specifically, the universal security indication information may be stored in a table form in trusted storage managed by the TUI controller. For a specific storage form, refer to Table 1. Specifically, the TUI controller sets corresponding storage information for a security indication information permission management table in the trusted storage, and the storage information generally includes security indication information, a set of identifiers of TAs that can read the information, and a set of identifiers of TAs that can modify the indication information.

Optionally, the security indication information set by the user may be sent to a management server of the TEE by using a secure channel. After the security indication information is processed by the management server, for example, converting an input text into an image, and adding a watermark of the management server of the TEE, the security indication information is used as personalized data of the TEE, and is loaded to the TEE by updating TEE configuration. Specifically, the secure channel connected to the remote TEE management server or a trusted application TA server may be established by the terminal. The secure channel is established based on a key of a TEE root security domain or a key of a security domain associated with a trusted application. The universal security indication information input by the user is sent to the TEE management server or the TA management server by using the secure channel. The management server saves and processes received information, for example, converting the information into an image and adding a watermark. Then, processed information is loaded to a TEE security domain by using the secure channel between the management server and the TEE root security domain or a security domain in which an application is located. The security domain may be understood as independent storage space in TEE security storage, and is used for installing a trusted application. Each trusted application is associated with a security domain.

Step 38: The trusted OS of the terminal sets an access permission of the universal security indication information for the trusted OS or any TA installed in a current system, and sets a modification permission for the trusted OS.

Step 39: The trusted OS of the terminal continues other necessary initialization work, and loads the REE after TEE initialization is completed, to normally start the terminal.

Embodiment 2

Figure 4:
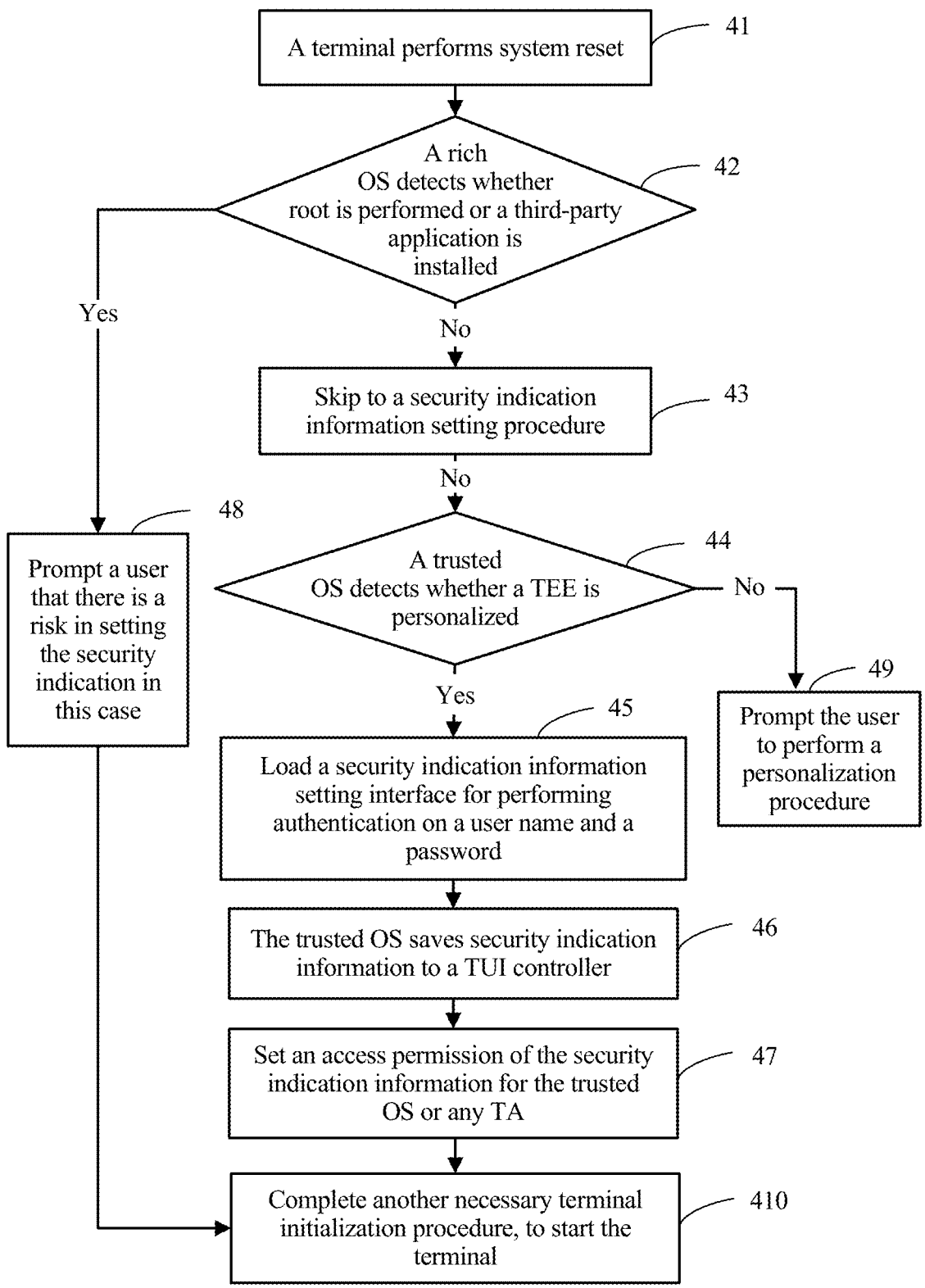
FIG. 4 is a flowchart of configuring universal security indication information according to Embodiment 2 of the present invention.

A running scenario of a terminal in Embodiment 2 is as follows: When a trusted operating system and a rich operating system of the terminal are started, for example, when the terminal is started for the first time, or after the terminal completes double-wipe double-wipe to wipe cache, or after factory reset is performed on the terminal, in this case, the terminal has completed start procedures of a TEE and a REE, and guides a user to a setting interface of the terminal and then to a universal security indication information configuration procedure of the terminal. For details, refer to FIG. 4.

Step 41: The terminal performs system reset.

Step 42: The terminal runs a system program in the REE, and detects whether an application with an illegal source is installed or rooted; and step 43 is performed if root is not performed and the application with an illegal source is not installed; or step 48 is performed if root is performed or the application with an illegal source is installed, to prompt a user that the terminal is in a risk state.

Step 43: The terminal enters into a power-on setting interface, and inserts, on the power-on setting page of the terminal, a prompt of setting security indication information, and a client application module in the REE calls a TUI controller to guide the terminal to skip from the power-on setting interface to a procedure interface of setting universal security indication information. The client module may call the TUI controller by using a client API or in a memory sharing manner.

Step 44: The trusted OS of the terminal detects whether personalization of the TEE is completed; and step 45 is performed if the personalization of the TEE is completed; or step 49 is performed if the personalization of the TEE is not completed.

Step 45: The terminal presents a universal security indication information setting page to the user, where the setting page includes at least a "universal security indication information input box" and a "user identity authentication information input box"; and then step 46 is performed, where the user identity authentication information input box may include a user name and password input box, and a user name and a password for a TEE access permission that are set during the TEE personalization need to be input to the "user identity authentication information input box" in this case.

Step 46: The TUI controller of the terminal receives universal security indication information input by the user, and saves the input universal security indication information. Optionally, the universal security indication information input by the user is sent to a management server of the TEE, and then is loaded to the TEE. For details, refer to Embodiment 1. Details are not described herein again.

Step 47: The trusted OS of the terminal sets an access permission of the security indication information for any TA or the trust OS, and sets a modification permission of the security indication information for the trusted OS.

Step 48: The terminal prompts the user that there is a risk in setting the security indication information, and then step 410 is performed.

Step 49: The terminal prompts the user to execute a TEE personalization procedure, and then step 410 is performed.

Step 410: The terminal completes another necessary start procedure, to start the terminal.

Embodiment 3

Figure 5:
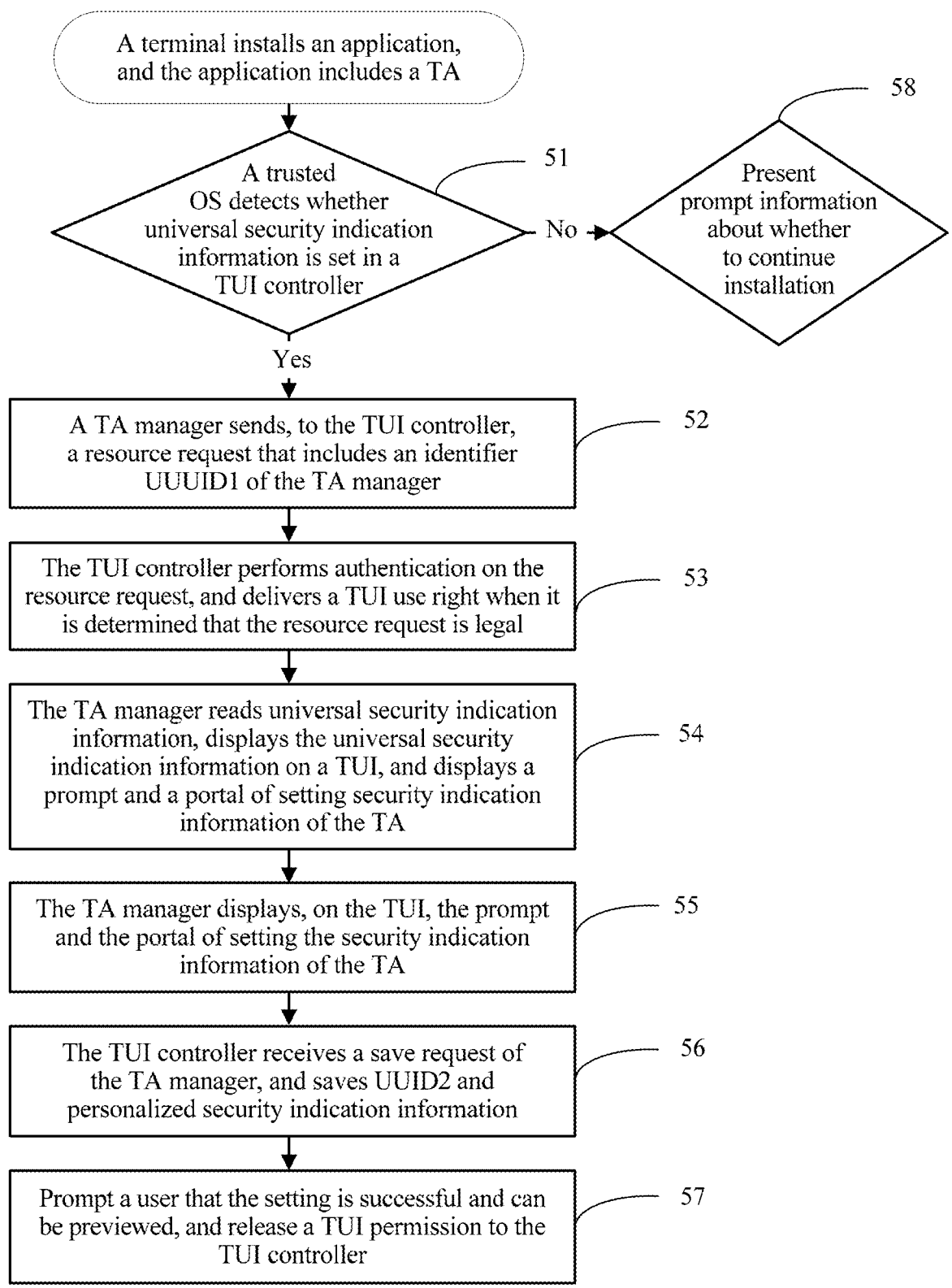
FIG. 5 is a flowchart of configuring personalized security indication information of a trusted application according to Embodiment 3 of the present invention.

A running scenario of a terminal in Embodiment 3 is as follows: In a start process, the terminal detects that universal security indication information is set. After the start process of the terminal is completed, when a user downloads and installs any application that includes a TA part, a CA requests to download a related TA after the CA of the application is downloaded and installed. When the TA is installed, for a specific procedure of setting personalized security indication information for the application, refer to FIG. 5.

Step 51: A trusted OS of the terminal detects whether universal security indication information is set in a TUI controller; and step 52 is performed if universal security indication information is set in the TUI controller; or step 58 is performed if no universal security indication information is set in the TUI controller, to prompt the user that security indication information is not initialized and there is a phishing risk, and request the user to determine whether to continue installation or exit installation.

Step 52: A TA manager of the terminal request a TUI resource for displaying a "TA security indication information setting interface". Specifically, the TA manager sends, to the TUI controller, a resource request that includes a universally unique identifier (Universally Unique Identifier, UUID) of the TA manager, and the universally unique identifier is marked as a UUID1.

Step 53: The TUI controller of the terminal performs authentication on the resource request, and assigns a TUI display resource control permission to the TA manager when it is determined that the request is legal. Specifically, the TUI controller receives the resource request sent by the TA manager. The request includes the UUID1 of the TA manager, a universal security indication information read operation, and a request for a TUI resource use permission. After receiving the request, the TUI controller queries a security indication information permission management table, that is, Table 1, and assigns a TUI use permission to the TA manager if it is determined that the TA manager can read the universal security indication information and display the universal security indication information on a TUI interface.

Step 54: The TA manager of the terminal reads the universal security indication information in the TUI controller, and displays the read universal security indication information on a TUI interface.

Step 55: The TA manager of the terminal pushes, to the TUI interface, prompt information that "xx application is being installed; please set security indication information for this application", and displays, on the TUI, the universal security indication information, a personalized indication information input box for a trusted application being installed, that is, a trusted application with a UUID2 identifier, and a "user identity authentication information input box" with a next button and a cancel button. In this case, a user name and a password for a TEE access permission that are set during TEE personalization need to be input to the "user identity authentication information input box".

Step 56: The TA manager of the terminal sends, to the TUI controller, a saving request that includes the trusted application identifier UUID2 and input personalized security indication information of the trusted application, and the TUI controller receives and saves the UUID2 and the related personalized security indication information, and sets both an access permission and a modification permission of the personalized security indication information for the TA and the trusted OS. Optionally, the terminal may send the security indication information for the application to a trusted application management server, and then the security indication information after being processed is downloaded to a TEE security domain. For details, refer to Embodiment 1. Details are not described herein again.

Step 57: The terminal prompts the user that personalized security information of an application is successfully set, and releases a TUI permission to the TUI controller.

Embodiment 4

Figure 6:
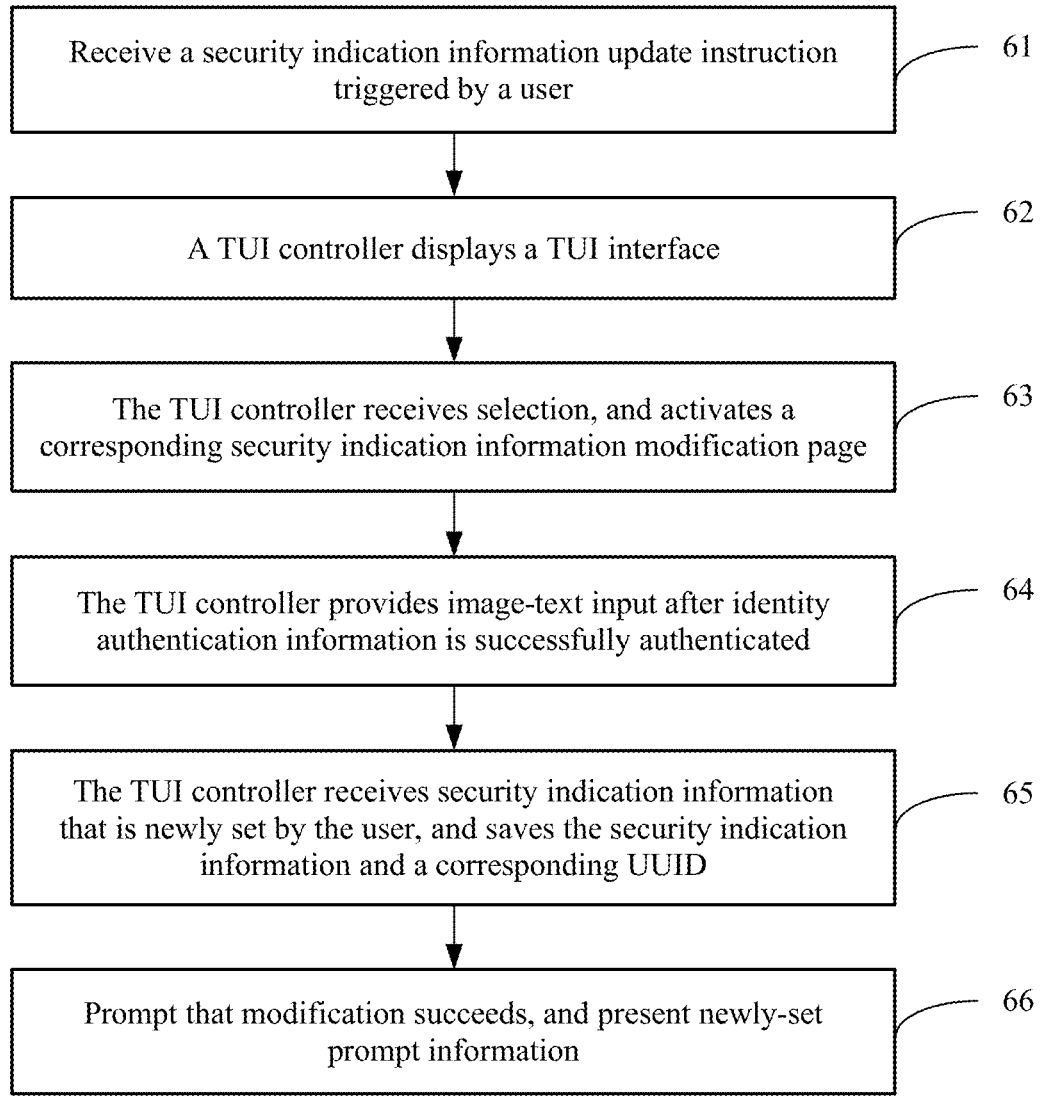
FIG. 6 is a flowchart of modifying security indication information according to Embodiment 4 of the present invention.

A running scenario of a terminal in Embodiment 4 is as follows: In a start process, the terminal detects that universal security indication information is set. After the process of starting the terminal is completed, a user taps an update request button for the universal security indication information, or taps, by using an installed application, an update request button for personalized security indication information of the application, to trigger a security indication information update procedure. For details, refer to FIG. 6.

Step 61: The user taps a security indication information update button on a rich OS interface, and the rich OS interface sends an update request to a TUI controller by using a client API in a TEE; or the user taps a security indication information update button on a TUI interface, and the TUI interface sends an update request to a TUI controller by using an internal API in a TEE.

Step 62: The TUI controller of the terminal triggers displaying of the TUI interface. In this case, the universal security indication information, a universal security indication information update portal, and an update portal of security indication information of a TA are presented on the TUI interface.

Step 63: The TUI controller of the terminal receives different update requests generated after the user taps different portals in step 62, and determines whether a request is for updating the universal security indication information or for updating personalized security indication information for a TA. If a UUID obtained from an update request is null, or a particular UUID representing a trusted OS is obtained, the update request is a request for updating the universal security indication information. Then, a "user identity authentication information input box" should be presented on the TUI interface, to request the user to input a user account and a password for the universal security indication. In this case, a user name and a password for an access permission of the TEE that are set during TEE personalization need to be input. If a UUID obtained from an update request is a UUID of a TA installed in the TEE, the update request is a request for updating personalized security indication information of the TA, and a "user identity authentication information input box" should be presented on the TUI interface, to request the user to input a user account and a password that are set by the user when the TA is installed.

Step 64: The terminal provides a text input box or an image input box after identify authentication information input by the user is successfully authenticated.

Step 65: The terminal receives image and text information set by the user, and binds and saves the image and text information and a UUID of a corresponding application. Optionally, the terminal may further send the image and text information to a TEE management server, and the image and text information after being processed is downloaded to the TEE. For details, refer to Embodiment 1.

Step 66: The terminal uses the TUI interface to prompt the user that modification succeeds, and to display newly-set security indication information.

It should be noted that, in step 61, the user may further tap an update request for personalized security indication information of an application by using a TUI of the application. Then, in step 62, the TUI controller triggers displaying of the TUI interface. In this case, the universal security indication information and an update portal of the personalized security indication information of the TA are presented on the TUI interface. Then, step 63 to step 65 are performed.

Figure 7:
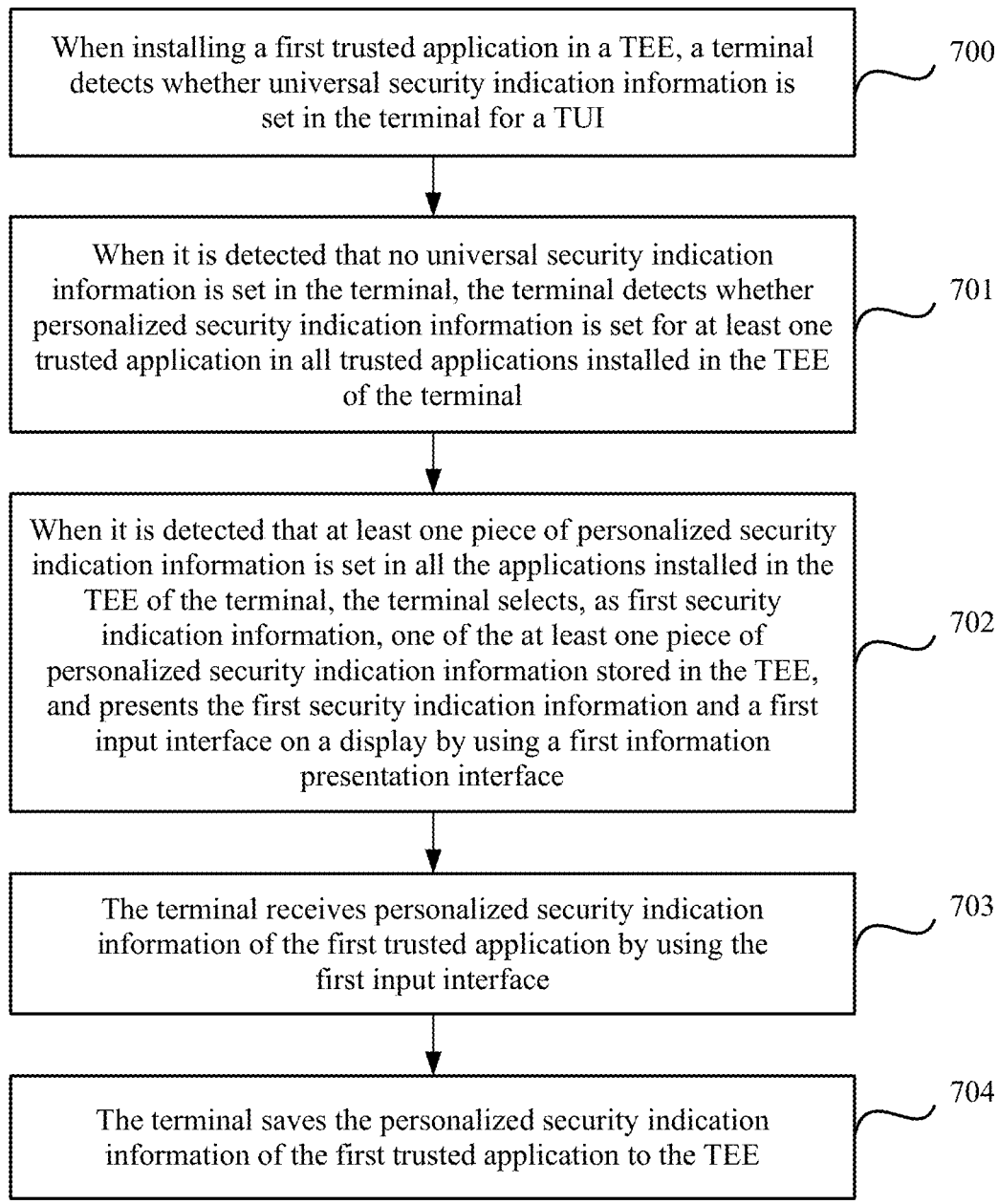
FIG. 7 is a flowchart of a security indication information configuration method according to another embodiment of the present invention.

Based on the universal security indication information setting method that is for the terminal and that is shown in FIG. 2, referring to FIG. 7, an embodiment of the present invention further provides a personalized security indication information setting method for a trusted application. A specific procedure is as follows.

Step 700: When installing a first trusted application in a TEE, a terminal detects whether universal security indication information is set in the terminal for a TUI.

Step 701: When it is detected that no universal security indication information is set in the terminal, the terminal detects whether personalized security indication information is set for at least one trusted application in all trusted applications installed in the TEE of the terminal.

Step 702: When it is detected that the personalized security indication information is set for the at least one trusted application in all the trusted applications installed in the TEE, present first security indication information and a first input interface on a display by using a first information presentation interface, where the first security indication information is personalized security indication information of one of the at least one trusted application.

Specifically, in step 702, before the terminal presents the first security indication information and the first input interface on the display by using the first information presentation interface, the terminal presents an identity authentication portal for an access permission of the first security indication information on the display by using a second information presentation interface. Optionally, in this case, when the terminal presents the identity authentication portal for the access permission of the first security indication information on the display by using the second information presentation interface, the terminal further presents any combination of an identifier of a trusted application corresponding to the first security indication information, or description information of the trusted application, or the first security indication information. Only after identity authentication information input from the identity authentication portal is successfully authenticated, the terminal presents the first security indication information and the first input interface on the display by using the first information presentation interface.

Step 703: The terminal receives personalized security indication information of the first trusted application by using the first input interface.

Step 704: The terminal saves the personalized security indication information of the first trusted application to the TEE.

Further, in step 700, when it is detected that universal security indication information is set in the terminal, in this case, the terminal performs the following operations:

presenting, by the terminal, the universal security indication information and a second input interface on the display by using the first information presentation interface;

receiving, by the terminal, the personalized security indication information of the first trusted application by using the second input interface; and saving, by the terminal, the personalized security indication information of the first trusted application to the TEE.

Further, before the terminal presents the universal security indication information and the first input interface on the display by using the first information presentation interface, the terminal presents an identity authentication portal for a TEE access permission on the display by using the second information presentation interface. Only after identity information input from the identity authentication portal for the access permission of the TEE is successfully authenticated, the terminal presents the universal security indication information and the first input interface on the display by using the first information presentation interface.

Specifically, the terminal further needs to configure an access permission and a modification permission of the personalized security indication information of the first trusted application after the terminal saves the personalized security indication information of the first trusted application to the TEE. A specific process is as follows: configuring both the access permission and the modification permission of the personalized security indication information of the first trusted application for the first trusted application and a trusted operating system of the terminal.

Further, after the terminal saves the personalized security indication information of the first trusted application to the TEE of the terminal, the method further includes:

detecting, by the terminal, whether there is an update request for the personalized security indication information of the first trusted application;

when an update request for the personalized security indication information of the first trusted application is detected, presenting, by the terminal, the personalized security indication information of the first trusted application and an identity authentication portal for an access permission of the first trusted application on the display by using the second information presentation interface; and after identity information input from the identity authentication portal for the access permission of the first trusted application is successfully authenticated, presenting, by the terminal, an update portal of the first security indication information on the display by using the first information presentation interface;

receiving, by the terminal, newly-input personalized security indication information of the first trusted application by using the update portal;

saving, by the terminal, the newly-input personalized security indication information of the first trusted application to the TEE of the terminal, and configuring an access permission and a modification permission of the new personalized security indication information of the first trusted application; and presenting, on the display by the terminal by using the first information presentation interface, the new personalized security indication information of the first trusted application and prompt information that the personalized security indication information of the first trusted application is successfully modified.

It should be noted that the first information presentation interface and the second information presentation interface are a same interface or different interfaces, and both are TUIs of the terminal or command-line interfaces controlled by the trusted operating system of the terminal.

Figure 8:
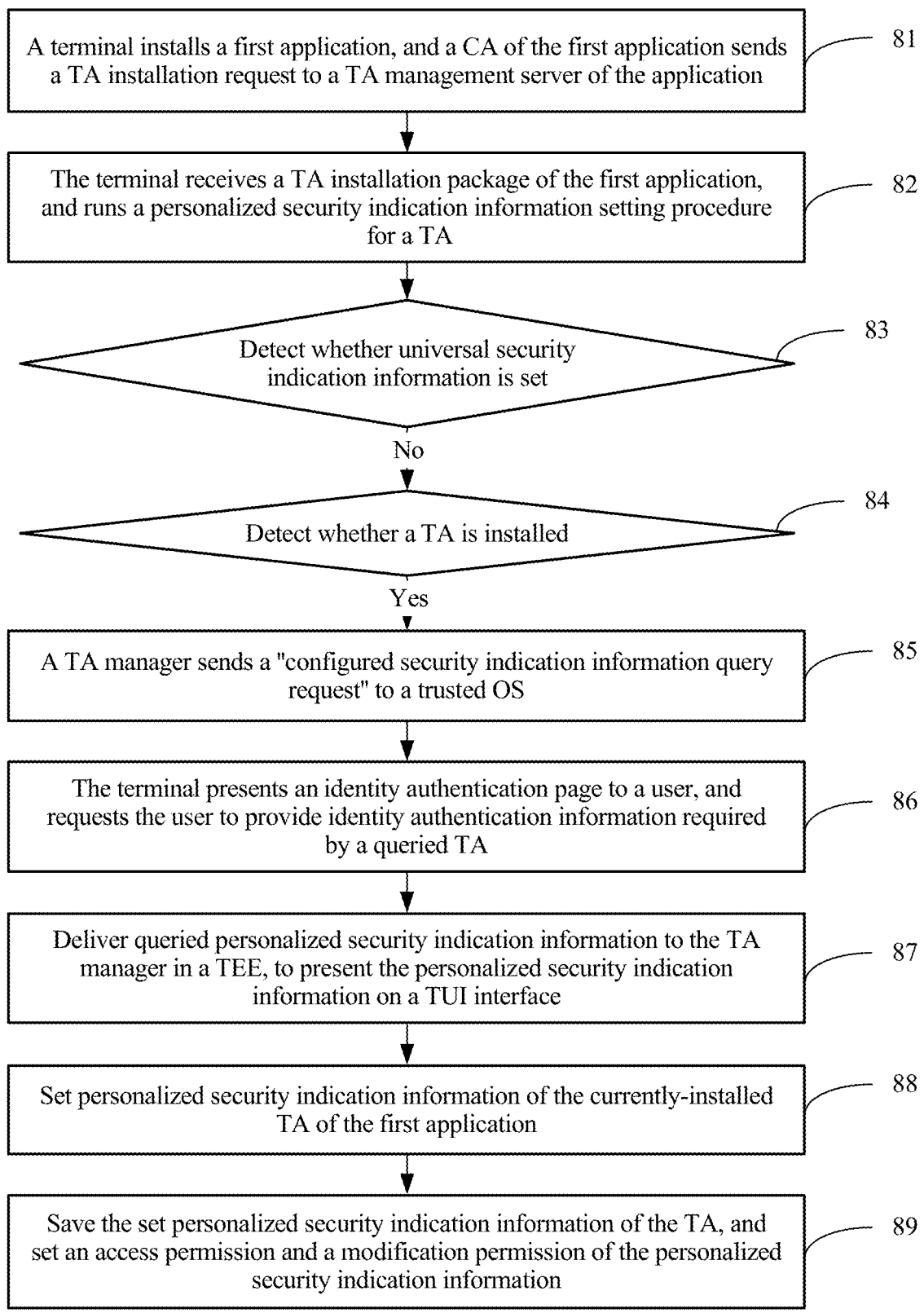
FIG. 8 is a flowchart of configuring personalized security indication information of another trusted application according to Embodiment 5 of the present invention.

The following describes the method in FIG. 7 in detail by using Embodiment 5. For a specific procedure, refer to FIG. 8.

Step 81: A user selects, from an application market in a terminal, an application that is assumed as a first application; when the user downloads the first application by means of tapping, the terminal downloads a client installation package part of the first application from an application market server and installs the package in a REE; and an installed CA sends a TA installation request to a TA management server of the application after installation is completed.

Step 82: The terminal receives a TA installation package of the first application, starts to install a TA part, and runs a personalized security indication information setting procedure for a TA.

Step 83: When installing the TA installation package of the first application, the terminal detects whether universal security indication information is set, and detects a running status if no universal security indication information is set. Specifically, the terminal detects whether a TA installation package is installed in a TEE.

Step 84: A TA manager of the terminal sends a "configured security indication information query request" to a trusted OS when a TA is installed in the TEE, and the trusted OS queries a TA that is installed in the trusted OS for the last time.

Step 85: If the trusted OS of the terminal receives the query request, and determines that an installed TA installation package includes personalized security indication information, the terminal presents an identity authentication page to the user, and requests the user to provide identity authentication information required by a queried TA.

Step 86: After authentication for the identity information input by the user succeeds, the terminal delivers queried personalized security indication information to the TA manager in the TEE, to present the personalized security indication information on a TUI interface. That is, the TA manager prompts, by using the personalized security indication information of the installed TA, the user that a current interface is secure.

Step 87: The user determines, by using the personalized security indication information of the installed TA, that the current interface is a trusted interface, and then sets personalized security indication information of the currently-installed TA of the first application.

Step 88: Save, to the TEE, the personalized security indication information of the currently-installed TA of the first application, or save the personalized security indication information to a TEE management server and download the personalized security indication information after being processed to the TEE, and set an access permission and a modification permission of the personalized security indication information.

Figure 9:
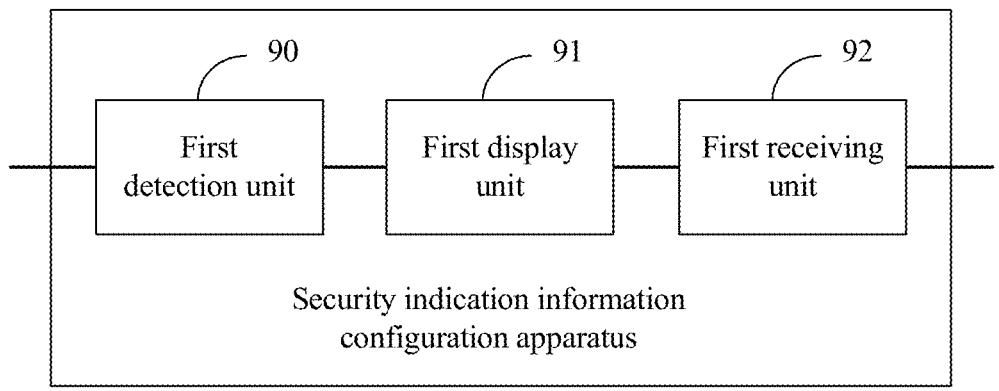
FIG. 9 is a schematic structural diagram of a security indication information configuration apparatus according to an embodiment of the present invention.

Based on the foregoing embodiments, referring to FIG. 9, an embodiment of the present invention provides a security indication information configuration apparatus, including:

a first detection unit 90, configured to detect whether universal security indication information is set in a terminal for a trusted user interface TUI, where the first detection unit 90 is further configured to detect a running status of the terminal when it is detected that no universal security indication information is set in the terminal for the TUI;

a first display unit 91, configured to: when it is detected that the running status of the terminal is a secure state, present a first input interface on a display by using a first information presentation interface; and a first receiving unit 92, configured to receive input universal security indication information by using the first input interface, and save the universal security indication information to a trusted execution environment TEE of the terminal.

Optionally, when the first detection unit 90 detects that the universal security indication information is set in the terminal for the TUI, the first display unit 91 is further configured to: when the terminal after being started detects that a first trusted application stored in the TEE is installed, present the universal security indication information and a second input interface on the display by using the first information presentation interface.

The first receiving unit 92 is further configured to receive input personalized security indication information of the first trusted application by using the second input interface, and save the personalized security indication information of the first trusted application to the TEE.

Optionally, when detecting the running status of the terminal, the first detection unit 90 is specifically configured to:

in a process of starting a trusted operating system of the terminal or when a rich operating system is not started after the trusted operating system is started, detect whether universal security indication information is set in the terminal for the TUI; if it is detected that no universal security indication information is set in the terminal for the TUI, detect whether the terminal is started for the first time; if the terminal is started for the first time, further detect whether personalization of the terminal is completed; and if it is detected that the personalization of the terminal is completed, determine that the running status of the terminal is a first secure state, where the secure state includes the first secure state.

Optionally, when detecting the running status of the terminal, the first detection unit 90 is specifically configured to:

in a process of starting a trusted operating system of the terminal or when a rich operating system is not started after the trusted operating system is started, detect whether the universal security indication information is set in the terminal for the TUI; if it is detected that no universal security indication information is set in the terminal for the TUI, detect whether the terminal is started for the first time; if the terminal is started for the first time, further detect whether personalization of the terminal is completed; and if it is detected that the personalization of the terminal is not completed, determine that the running status of the terminal is a second secure state, where the secure state includes the second secure state.

Optionally, when detecting the running status of the terminal, the first detection unit 90 is specifically configured to:

in a process of starting a trusted operating system of the terminal or when a rich operating system is not started after the trusted operating system is started, whether the universal security indication information is set in the terminal for the TUI; if it is detected that no universal security indication information is set in the terminal for the TUI, detect whether the terminal is started for the first time; and if the terminal is not started for the first time, determine that the running status of the terminal is a risk state, and present, on the display by using the first information presentation interface, prompt information for performing system reset on the terminal or for continuing starting.

Optionally, when detecting the running status of the terminal, the first detection unit 90 is specifically configured to:

when both a trusted operating system and a rich operating system of the terminal are started, detect whether the universal security indication information is set in the terminal for the TUI; if it is detected that no universal security indication information is set in the terminal for the TUI, detect whether an application with an illegal source is not installed on the terminal and system permission of the terminal is not obtained; if the application with an illegal source is not installed on the terminal and the system permission of the terminal is not obtained, further detect whether personalization of the terminal is completed; and if it is detected that the personalization of the terminal is completed, determine that the running status of the terminal is a third secure state, where the secure state includes the third secure state.

Optionally, when detecting the running status of the terminal, the first detection unit 90 is specifically configured to:

when both a trusted operating system and a rich operating system of the terminal are started, detect whether the universal security indication information is set in the terminal for the TUI; if it is detected that no universal security indication information is set in the terminal for the TUI, detect whether an application with an illegal source is not installed on the terminal and system permission of the terminal is not obtained; and if the application with an illegal source is installed on the terminal or the system permission of the terminal is obtained, determine that the running status of the terminal is a risk state, and present, on the display by using the first information presentation interface, prompt information that the terminal is risky.

Optionally, when the first detection unit 90 determines that the running status of the terminal is the first secure state or the third secure state, before presenting the first input interface on the display by using the first information presentation interface, the first display unit 91 is further configured to:

present an identity authentication portal for a TEE access permission on the display by using a second information presentation interface; and perform authentication on identity information received by using the identity authentication portal.

Optionally, when the first detection unit 90 determines that the running status of the terminal is the second secure state, before presenting the first input interface on the display by using the first information presentation interface, the first display unit 91 is further configured to:

present, on the display by using a second information presentation interface, prompt information for performing personalization on the terminal.

Optionally, after receiving the input universal security indication information by using the first input interface, and saving the universal security indication information to the trusted execution environment TEE of the terminal, the first receiving unit 92 is further configured to:

configure an access permission of the universal security indication information for all trusted applications in the TEE, and set a modification permission of the universal security indication information for the trusted operating system of the terminal.

Optionally, after saving the personalized security indication information of the first trusted application to the TEE, the first receiving unit 92 is further configured to:

configure both an access permission and a modification permission of the personalized security indication information of the first trusted application for the first trusted application and a trusted operating system of the terminal.

Optionally, before presenting the universal security indication information and the second input interface on the display by using the first information presentation interface, the second display unit is further configured to:

present an identity authentication portal for a TEE access permission on the display by using a second information presentation interface.

Optionally, when determining that the universal security indication information is set in the terminal for the TUI, the first detection unit 90 is further configured to:

detect whether there is an update request for first security indication information;

the first display unit 91 is further configured to: when the first detection unit 90 detects an update request for the first security indication information, present the universal security indication information and an identity authentication portal for a TEE access permission on the display by using a second information presentation interface; and after identity information input from the identity authentication portal is successfully authenticated, present an update portal of the first security indication information on the display by using the first information presentation interface;

the first receiving unit 92 is further configured to receive newly-input first security indication information by using the update portal, save the newly-input first security indication information to the TEE of the terminal, and configure a corresponding access permission and a corresponding modification permission for the new first security indication information; and the first display unit 91 is further configured to present, on the display by using the first information presentation interface, the new first security indication information and prompt information that the first security indication information is successfully modified, where the first security indication information is the universal security indication information or personalized security indication information of any application.

Optionally, the first information presentation interface and the second information presentation interface are a same interface or different interfaces, and both are TUIs of the terminal or command-line interfaces controlled by the trusted operating system of the terminal.

Figure 10:
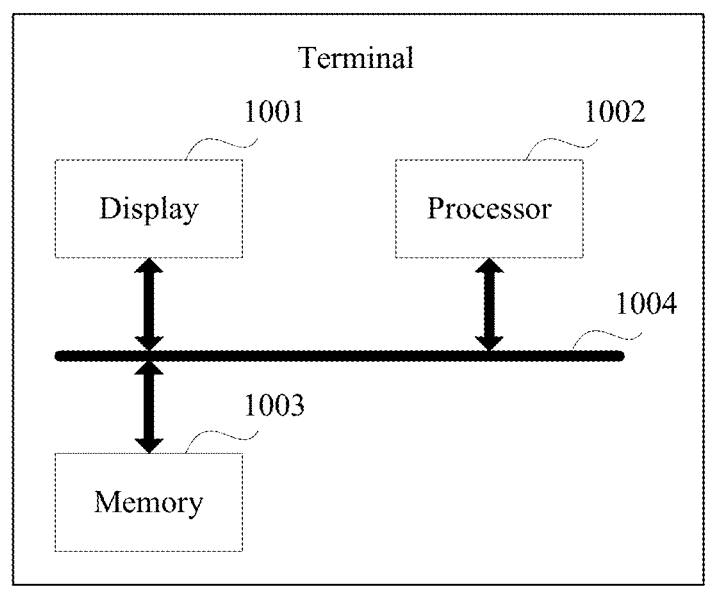
FIG. 10 is a schematic structural diagram of a terminal according to an embodiment of the present invention.

An embodiment of the present invention further provides a terminal. The terminal can be configured to execute the methods in the foregoing embodiments in FIG. 2 to FIG. 8. As shown in FIG. 10, FIG. 10 is a schematic structural diagram of a terminal according to an embodiment of the present invention. The terminal includes a display 1001, a processor 1002, and a memory 1003. The display 1001, the processor 1002, and the memory 1003 are connected to each other. A specific connection medium between the foregoing components is not limited in this embodiment of the present invention. In this embodiment of the present invention, in FIG. 10, the memory 1003, the processor 1002, and the display 1001 are connected to each other by using a bus 1004. The bus is represented by using a thick line in FIG. 10. A manner of connection between other components is only an example, and is not constructed as limitation. The bus may be classified into an address bus, a data bus, a control bus, and the like. For ease of representation, only one thick line is used in FIG. 10 for representation. However, it does not indicate that there is only one bus or one type of bus.

The memory 1003 in this embodiment of the present invention is configured to store program code executed by the processor 1002, and may be a volatile memory (English: volatile memory) such as a random-access memory (English: random-access memory, RAM for short). Alternatively, the memory 1003 may be a non-volatile memory (English: non-volatile memory) such as a read-only memory (English: read-only memory, ROM for short), a flash memory (English: flash memory), a hard disk drive (English: hard disk drive, HDD for short), or a solid-state drive (English: solid-state drive, SSD for short). Alternatively, the memory 1003 is any other medium that can be used to carry or store expected program code in a command or data structure form and that can be accessed by a computer. However, this is not limited thereto. The memory 1003 may be a combination of the foregoing memories.

The processor 1002 in this embodiment of the present invention may be a central processing unit (English: central processing unit, CPU for short).

The processor 1002 is configured to invoke the program code or an instruction stored in the memory 1003, to perform the methods in the foregoing embodiments in FIG. 2 to FIG. 8, and perform output display by using the display 1001.

Figure 11:
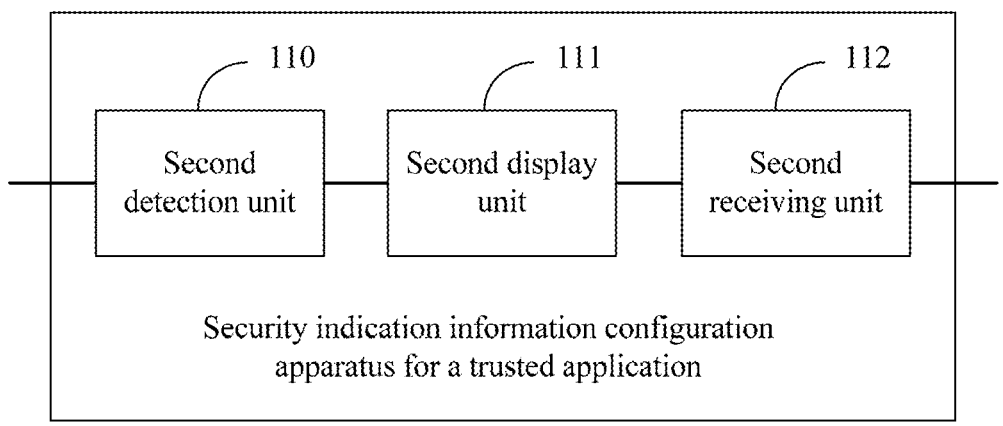
FIG. 11 is a schematic structural diagram of a security indication information configuration apparatus according to another embodiment of the present invention.

Based on the foregoing embodiments, referring to FIG. 11, an embodiment of the present invention provides a security indication information configuration apparatus for a trusted application, and the apparatus includes:

a second detection unit 110, configured to: when a first trusted application is installed in a trusted execution environment TEE, detect whether universal security indication information is set in the terminal for a TUI, where the second detection unit 110 is further configured to: when it is detected that no universal security indication information is set in the terminal, detect whether personalized security indication information is set for at least one trusted application in all trusted applications installed in the TEE of the terminal;

a second display unit 111, configured to: when the second detection unit 110 detects that the personalized security indication information is set for the at least one trusted application in all the trusted applications installed in the TEE of the terminal, present first security indication information and a first input interface on a display by using a first information presentation interface, where the first security indication information is personalized security indication information of one of the at least one trusted application; and a second receiving unit 112, configured to receive personalized security indication information of the first trusted application by using the first input interface, and save the personalized security indication information of the first trusted application to the TEE.

Optionally, when the second detection unit 110 detects that the universal security indication information is set in the terminal, the second display unit 111 is further configured to:

present the universal security indication information and a second input interface on the display by using the first information presentation interface; and the second receiving unit 112 is further configured to receive the personalized security indication information of the first trusted application by using the second input interface, and save the personalized security indication information of the first trusted application to the TEE.

Optionally, before presenting the first security indication information and the first input interface on the display by using the first information presentation interface, the second display unit 111 is further configured to:

present an identity authentication portal for an access permission of the first security indication information on the display by using a second information presentation interface.

Optionally, before presenting the universal security indication information and the first input interface on the display by using the first information presentation interface, the second display unit 111 is further configured to:

present an identity authentication portal for a TEE access permission on the display by using the second information presentation interface.

Optionally, after saving the personalized security indication information of the first trusted application to the TEE, the second receiving unit 112 is further configured to:

configure both an access permission and a modification permission of the personalized security indication information of the first trusted application for the first trusted application and a trusted operating system of the terminal.

Optionally, after the second receiving unit 112 saves the personalized security indication information of the first trusted application to the TEE, the second detection unit 110 is further configured to:

detect whether there is an update request for the personalized security indication information of the first trusted application;

the second display unit 111 is further configured to: when the second detection unit 110 detects an update request for the personalized security indication information of the first trusted application, present the personalized security indication information of the first trusted application and an identity authentication portal for an access permission of the first trusted application on the display by using the second information presentation interface, and after identity information input from the identity authentication portal for the access permission of the first trusted application is successfully authenticated, present an update portal of the first security indication information on the display by using the first information presentation interface;

the second receiving unit 112 is further configured to receive newly-input personalized security indication information of the first trusted application by using the update portal; and save the newly-input personalized security indication information of the first trusted application to the TEE of the terminal; and the second display unit 111 is further configured to present, on the display by using the first information presentation interface, the new personalized security indication information of the first trusted application and prompt information that the personalized security indication information of the first trusted application is successfully modified.

Optionally, the first information presentation interface and the second information presentation interface are a same interface or different interfaces, and both are TUIs of the terminal or command-line interfaces controlled by the trusted operating system of the terminal.

Figure 12:
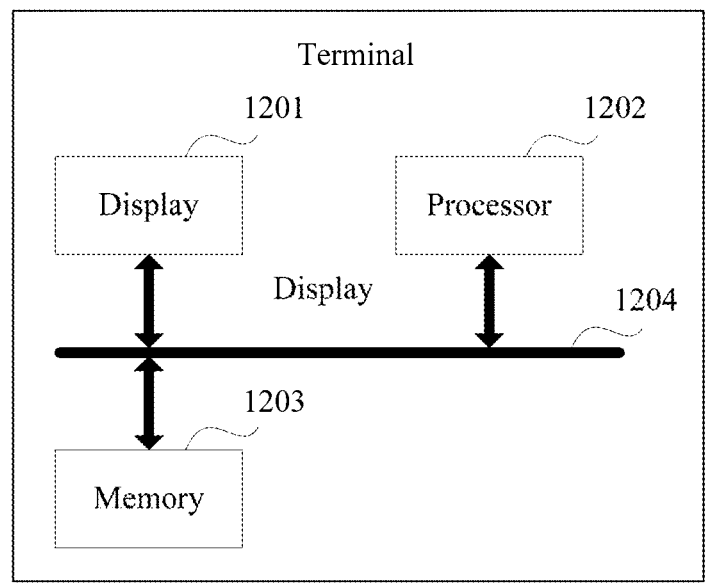
FIG. 12 is a schematic structural diagram of a terminal according to another embodiment of the present invention.

An embodiment of the present invention further provides a terminal. The terminal can be configured to execute the methods in the foregoing embodiments in FIG. 2 to FIG. 8. As shown in FIG. 12, FIG. 12 is a schematic structural diagram of a terminal according to an embodiment of the present invention. The terminal includes a display 1201, a processor 1202, and a memory 1203. The display 1201, the processor 1202, and the memory 1203 are connected to each other. A specific connection medium between the foregoing components is not limited in this embodiment of the present invention. In this embodiment of the present invention, in FIG. 12, the memory 1203, the processor 1202, and the display 1201 are connected to each other by using a bus 1204. The bus is represented by using a thick line in FIG. 12. A manner of connection between other components is only an example, and is not constructed as limitation. The bus may be classified into an address bus, a data bus, a control bus, and the like. For ease of representation, only one thick line is used in FIG. 12 for representation. However, it does not indicate that there is only one bus or one type of bus.

The memory 1203 in this embodiment of the present invention is configured to store program code executed by the processor 1202, and may be a volatile memory (English: volatile memory) such as a random-access memory (English: random-access memory, RAM for short). Alternatively, the memory 1203 may be a non-volatile memory (English: non-volatile memory) such as a read-only memory (English: read-only memory, ROM for short), a flash memory (English: flash memory), a hard disk drive (English: hard disk drive, HDD for short), or a solid-state drive (English: solid-state drive, SSD for short). Alternatively, the memory 1203 is any other medium that can be used to carry or store expected program code in a command or data structure form and that can be accessed by a computer. However, this is not limited thereto. The memory 1203 may be a combination of the foregoing memories.

The processor 1202 in this embodiment of the present invention may be a central processing unit (English: central processing unit, CPU for short).

The processor 1202 is configured to invoke the program code or an instruction stored in the memory 1203, to perform the methods in the foregoing embodiments in FIG. 2 to FIG. 8, and perform output display by using the display 1201.

In conclusion, the embodiments of the present invention provide a security indication information configuration method and device. The method includes: detecting, by a terminal, whether universal security indication information is set in the terminal for a TUI; detecting, by the terminal, a running status of the terminal when it is detected that no universal security indication information is set in the terminal for the TUI; when it is detected that the running status of the terminal is a secure state, presenting, by the terminal, a first input interface on a display by using a first information presentation interface; and receiving, by the terminal, input universal security indication information by using the first input interface, and saving the universal security indication information to a trusted execution environment TEE of the terminal. In this way, when detecting that no universal security indication information is set in the terminal, the terminal detects the running status of the terminal before the universal security indication information is set, so that the universal security indication information is set only when the running status of the terminal is the secure state. In this way, it can be ensured that the set universal security indication information is not attacked or obtained by malicious software or a malicious program, so as to ensure information security of a user.

A person of ordinary skill in the art may understand that all or a part of the steps in each of the foregoing method of the embodiments may be implemented by a program instructing a processor. The foregoing program may be stored in a computer readable storage medium. The storage medium may be a non-transitory (English: non-transitory) medium, such as a random-access memory, read-only memory, a flash memory, a hard disk, a solid state drive, a magnetic tape (English: magnetic tape), a floppy disk (English: floppy disk), an optical disc (English: optical disc), or any combination thereof.

The present invention is described with reference to the flowcharts and/or block diagrams of the method and the device according to the embodiments of the present invention. It should be understood that computer program instructions may be used to implement each process or each block in the flowcharts and the block diagrams and a combination of a process and a block in the flowcharts and the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and in one or more blocks in the block diagrams.

The foregoing descriptions are merely an implementation example of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A security indication information configuration method, comprising:

detecting, by a terminal, whether universal security indication information is not set in the terminal for a trusted user interface (TUI), the universal security indication information being usable for a trusted operating system of the terminal and all trusted applications installed in a trusted execution environment (TEE) of the terminal;

in response to a detection that the universal security indication information is not set, detecting, by the terminal, a running status of the terminal;

in response to a detection that the running status of the terminal is a secure state and the universal security indication information is not set, presenting, by the terminal, a first input interface on a display through a first information presentation interface, and receiving, by the terminal, input universal security indication information through the first input interface, and saving the universal security indication information to the TEE of the terminal; and in response to a detection that the universal security indication information is set in the terminal for the TUI, presenting, by the terminal, a second input interface on the display receiving, by the terminal, input personalized security indication information of a trusted application stored in the TEE through the second input interface, and saving, by the terminal, the personalized security indication information of the trusted application to the TEE.

2. The method according to claim 1, further comprising:
in response to the detection that the universal security indication information is set in the terminal for the TUI, detecting whether the trusted application stored in the TEE is installed, and
in response to detecting the trusted application stored in the TEE is installed presenting, by the terminal, the universal security indication information and the second input interface on the display through the first information presentation interface.

3. The method according to claim 1, wherein detecting the running status of the terminal comprises:
in a process of starting the trusted operating system of the terminal or when a rich operating system is not started after the trusted operating system is started, detecting, by the terminal, whether the universal security indication information is set in the terminal for the TUI;
detecting whether the terminal is started for the first time;
in response to a detection that the terminal is started for the first time, detecting whether personalization of the terminal is completed, and
in response to a detection that the personalization of the terminal is completed, determining that the running status of the terminal is a first secure state, wherein the secure state comprises the first secure state.

4. The method according to claim 3, further comprising:
when the terminal determines that the running status of the terminal is the first secure state or the third secure state, before presenting, by the terminal, a first input interface on a display by using a first information presentation interface;
presenting, by the terminal, an identity authentication portal for a TEE access permission on the display by using a second information presentation interface; and
performing, by the terminal, authentication on identity information received by using the identity authentication portal.

5. The method according to claim 1, wherein detecting the running status of the terminal comprises:
in a process of starting the trusted operating system of the terminal or when a rich operating system is not started after the trusted operating system is started, detecting, by the terminal, whether the universal security indication information is set in the terminal for the TUI;
detecting whether the terminal is started for the first time;
in response to a detection that the terminal is started for the first time, detecting whether personalization of the terminal is completed, and
in response to a detection that the personalization of the terminal is not completed, determining that the running status of the terminal is a second secure state, wherein the secure state comprises the second secure state.

6. The method according to claim 5, further comprising:
when the terminal determines that the running status of the terminal is the second secure state, before presenting the first input interface on the display,
presenting, on the display by the terminal through a second information presentation interface, prompt information for performing personalization on the terminal.

7. The method according to claim 1, wherein detecting the running status of the terminal comprises:

in a process of starting the trusted operating system of the terminal or when a rich operating system is not started after the trusted operating system is started, detecting, by the terminal, whether the universal security indication information is set in the terminal for the TUI;
detecting whether the terminal is started for the first time; and
in response to a detection that the terminal is not started for the first time, determining that the running status of the terminal is a risk state, and presenting, on the display by using the first information presentation interface, prompt information for performing system reset on the terminal or for continuing starting.

8. The method according to claim 1, wherein detecting the running status of the comprises:
when both the trusted operating system and a rich operating system of the terminal are started, detecting, by the terminal, whether the universal security indication information is set in the terminal for the TUI;
in response to a detection that no universal security indication information is set in the terminal for the TUI, detecting whether an application with an illegal source is not installed on the terminal and system permission of the terminal is not obtained;
in response to a detection that no application with an illegal source is installed on the terminal and the system permission of the terminal is not obtained, detecting whether personalization of the terminal is completed; and
in response to a detection that the personalization of the terminal is completed, determining that the running status of the terminal is a third secure state, wherein the secure state comprises the third secure state.

9. The method according to claim 1, wherein detecting the running status of the terminal comprises:
when both the trusted operating system and a rich operating system of the terminal are started, detecting, by the terminal, whether the universal security indication information is set in the terminal for the TUI;
in response to a detection that no universal security indication information is set in the terminal for the TUI, detecting whether an application with an illegal source is installed on the terminal and system permission of the terminal is obtained; and
in response to a detection that the application with the illegal source is installed on the terminal or the system permission of the terminal is obtained, determining that the running status of the terminal is a risk state, and presenting, on the display by using the first information presentation interface, prompt information that the terminal is risky.

10. The method according to claim 1, further comprising, after receiving the input universal security indication information and saving the universal security indication information to the trusted execution environment (TEE) of the terminal,
configuring, by the terminal, an access permission of the universal security indication information for all trusted applications in the TEE, and setting a modification permission of the universal security indication information for the trusted operating system of the terminal.

11. A terminal, comprising:
a display;
a memory storing program instructions; and
at least one processor, configured to execute the program instructions, wherein the program instructions, when executed by the at least one processor, control the at least one processor to perform operations comprising:

detecting whether universal security indication information is not set in the terminal for a trusted user interface (TUI), the universal security indication information being usable for a trusted operating system of the terminal and all trusted application installed in a trusted execution environment (TEE) of the terminal;

in response to a detection that the universal security indication information is not set, detecting a running status of the terminal;

in response to a detection that the running status of the terminal is a secure state and the universal security indication information is not set, presenting a first input interface on a display through a first information presentation interface, and receiving input universal security indication information through the first input interface, and saving the universal security indication information to the TEE of the terminal; and in response to a detection that the universal security indication information is set in the terminal for the TUI, presenting, by the terminal, a second input interface on the display, receiving, by the terminal, input personalized security indication information of a trusted application stored in the TEE trough the second input interface, and saving, by the terminal, the personalized security indication information of the trusted application to the TEE.

12. The terminal according to claim 11, wherein the program instructions, when executed by the ay least one processor, control the at least one processor to further perform operations comprising detecting that the universal security indication information is set in the terminal for the TUI, and in response to the detection that the universal security indication information is set, detecting whether the trusted application stored in the TEE is installed, and in response to detecting that the trusted application stored in the TEE is installed, presenting the universal security indication information and the second input interface on the display through the first information presentation interface.

13. The terminal according to claim 12, wherein the program instructions, when executed by the at least one processor, control the at last one processor to further perform operations comprising, when the terminal determines that the running status of the terminal is the first secure state or the third secure state, before presenting the first input interface on display, presenting an identity authentication portal for a TEE access permission on the display by using a second information presentation interface, and performing authentication on identity information received by using the identity authentication portal.

14. The terminal according to claim 11, wherein detecting the running status of the terminal comprises:

in a process of starting the trusted operating system of the terminal or when a rich operating system is not started after the trusted operating system is started, detecting whether the universal security indication information is set in the terminal for the TUI;

detecting whether the terminal is started for the first time;

in response to a detection that the terminal is started for the first time, detecting whether personalization of the terminal is completed; and in response to a detection that the personalization of the terminal is completed, determining that the running status of the terminal is a first secure state, wherein the secure state comprises the first secure state.

15. The terminal according to claim 14, wherein the program instructions, when executed by the at least one processor, control the at least one processor to further perform operations comprising, when the terminal determines that the running status of the terminal is the second secure state, before presenting the first input interface, presenting, on the display by the terminal by using a second information presentation interface, prompt information for performing personalization on the terminal.

16. The terminal according to claim 11, wherein detecting a running status of the comprises:

in a process of starting the trusted operating system of the terminal or when a rich operating system is not started after the trusted operating system is started, detecting whether the universal security indication information is set in the terminal for the TUI;

detecting whether the terminal is started for the first time;

in response to a detection that the terminal is started for the first time, detecting whether personalization of the terminal is completed; and in response to a detection that the personalization of the terminal is not completed, determining that the running status of the terminal is a second secure state, wherein the secure state comprises the second secure state.

17. The terminal according to claim 11, wherein detecting the running status of the terminal comprises:

in a process of starting the trusted operating system of the terminal or when a rich operating system is not started after the trusted operating system is started, detecting whether the universal security indication information is set in the terminal for the TUI;

detecting whether the terminal is started for the first time; and if the terminal is not started for the first time, determining that the running status of the terminal is a risk state, and presenting, on the display by using the first information presentation interface, prompt information for performing system reset on the terminal or for continuing starting.

18. The terminal according to claim 11, wherein detecting the running status of the terminal comprises:

detecting whether the universal security indication information is set in the terminal for the TUI;

if it is detected that no universal security indication information is set in the terminal for the TUI, detecting whether an application with an illegal source is not installed on the terminal and system permission of the terminal is not obtained;

in response to a detection that no application with an illegal source is installed on the terminal and the system permission of the terminal is not obtained, detecting whether personalization of the terminal is completed; and in response to a detection that the personalization of the terminal is completed, determining that the running status of the terminal is a third secure state, wherein the secure state comprises the third secure state.

19. The terminal according to claim 11, wherein detecting the running status of the terminal comprises:

when both the trusted operating system and a rich operating system of the terminal are started, detecting whether the universal security indication information is set in the terminal for the TUI;

in response to a detection that no universal security indication information is set in the terminal for the TUI, detecting whether an application with an illegal source is installed on the terminal and system permission of the terminal is obtained; and in response to a detection that the application with the illegal source is installed on the terminal or the system permission of the terminal is obtained, determining that the running status of the terminal is a risk state, and presenting, on the display by using the first information presentation interface, prompt information that the terminal is risky.

20. The terminal according to claim 11, wherein the program instructions, when executed by the at least one processor, control the at least one processor to further perform operations comprising, after receiving the input universal security indication information, and saving the universal security indication information to the trusted execution environment (TEE) of the terminal, configuring an access permission of the universal security indication information for all trusted applications in the TEE, and setting a modification permission of the universal security indication information for the trusted operating system of the terminal.

\* \* \* \* \*

UNITED STATES PATENT AND TRADEMARK OFFICE
CERTIFICATE OF CORRECTION

PATENT NO. : 11,100,227 B2  
APPLICATION NO. : 15/779090  
DATED : August 24, 2021  
INVENTOR(S) : Li et al.

Page 1 of 1

It is certified that error appears in the above-identified patent and that said Letters Patent is hereby corrected as shown below:

In the Claims

Claim 8, Column 36, Line 16, change "running status of the comprises:" to "running status of the terminal comprises:";

Claim 11, Column 37, Line 8, change "application installed" to "applications installed";

Claim 11, Column 37, Line 27, change "trough" to "through";

Claim 12, Column 37, Line 31, change "ay least one" to "at least one";

Claim 13, Column 37, Line 47, change "at last one" to "at least one";

Claim 13, Column 37, Line 51, change "on display" to "on the display";

Claim 16, Column 38, Line 16, change "running status of the comprises:" to "running status of the terminal comprises:".

Signed and Sealed this  
Twenty-first Day of September, 2021

Drew Hirshfeld  
*Performing the Functions and Duties of the  
Under Secretary of Commerce for Intellectual Property and  
Director of the United States Patent and Trademark Office*